US011579558B2

(12) United States Patent
Hiraoka et al.

(10) Patent No.: US 11,579,558 B2
(45) Date of Patent: Feb. 14, 2023

(54) IMAGE FORMING APPARATUS HAVING COVER WITH LINK TO SUPPORT EXPOSURE HEADS

(71) Applicant: Brother Kogyo Kabushiki Kaisha, Nagoya (JP)

(72) Inventors: Junichi Hiraoka, Nagoya (JP); Yohei Hashimoto, Nagakute (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 17/453,237

(22) Filed: Nov. 2, 2021

(65) Prior Publication Data
US 2022/0137545 A1    May 5, 2022

(30) Foreign Application Priority Data

Nov. 4, 2020  (JP) .............................. JP2020-184746
Nov. 4, 2020  (JP) .............................. JP2020-184747

(51) Int. Cl.
G03G 21/00    (2006.01)
B41J 2/00     (2006.01)
(Continued)

(52) U.S. Cl.
CPC ............ G03G 21/1633 (2013.01); B41J 2/45 (2013.01); G03G 15/0178 (2013.01);
(Continued)

(58) Field of Classification Search
CPC ............ G03G 15/1247; G03G 15/011; G03G 15/0178; G03G 15/04054; G03G 21/1633;
(Continued)

(56) References Cited

U.S. PATENT DOCUMENTS

2009/0252528 A1* 10/2009 Yamaguchi ........ G03G 21/1628
399/111
2013/0259521 A1* 10/2013 Sugiyama .......... G03G 21/1647
399/110
(Continued)

FOREIGN PATENT DOCUMENTS

JP    2007-065125 A    3/2007
JP    2009-251231 A    10/2009
(Continued)

Primary Examiner — Robert B Beatty
(74) Attorney, Agent, or Firm — Burr Patent Law, PLLC

(57) ABSTRACT

An image forming apparatus includes a housing having an opening, a cover movable between an open position and a closed position, a first photoconductive drum and a second photoconductive drum, a first exposing head having a first boss and rotatably coupled to the cover, a second exposing head having a second boss and rotatably coupled to the cover, and a cam rotatably coupled to each of the first exposing head and the second exposing head. The cam is configured to rotate each of the first exposing head and the second exposing head. The cam includes (i) a first elongated hole into which the first boss fits and extending a direction intersecting a movement direction in which the cam moves and (ii) a second elongated hole into which the second boss fits and extending in a direction intersecting the movement direction of the cam.

20 Claims, 13 Drawing Sheets

(51) Int. Cl.
  *G06K 15/00* (2006.01)
  *G03G 21/16* (2006.01)
  *G03G 15/04* (2006.01)
  *G03G 15/01* (2006.01)
  *G06K 15/12* (2006.01)
  *B41J 2/45* (2006.01)

(52) U.S. Cl.
  CPC ... *G03G 15/04054* (2013.01); *G06K 15/1247* (2013.01); *G03G 2215/0119* (2013.01); *G03G 2215/0409* (2013.01); *G03G 2221/169* (2013.01); *G03G 2221/1636* (2013.01); *G03G 2221/1687* (2013.01)

(58) Field of Classification Search
  CPC ....... G03G 21/1628; G03G 2215/0119; G03G 2215/0409; G03G 2215/0421; G03G 2221/1603; G03G 2221/1636; G03G 2221/1687; B41J 2/45; G06K 15/1247

USPC .................. 399/118, 125; 347/115, 117, 118
  See application file for complete search history.

(56) References Cited

U.S. PATENT DOCUMENTS

| 2013/0315625 A1* | 11/2013 | Fujita ................. G03G 21/1666 399/125 |
| 2018/0095407 A1* | 4/2018 | Tsukada ............. G03G 21/1628 |
| 2020/0209801 A1* | 7/2020 | Nakajima .......... G03G 21/1628 |
| 2020/0341425 A1* | 10/2020 | Hiraoka ............. G03G 21/1628 |

FOREIGN PATENT DOCUMENTS

| JP | 2012-058287 A | 3/2012 |
| JP | 2015-206833 A | 11/2015 |

* cited by examiner

IMAGE FORMING APPARATUS HAVING COVER WITH LINK TO SUPPORT EXPOSURE HEADS

CROSS REFERENCE TO RELATED APPLICATION

The present application claims priorities from Japanese Patent Application Nos. 2020-184746 and 2020-184747, which were filed on Nov. 4, 2020, the disclosures of which are herein incorporated by reference in their entireties.

BACKGROUND OF THE INVENTION

The following disclosure relates to an image forming apparatus.

There has been known a conventional image forming apparatus including a housing having an opening, a first exposing head, a second exposing head, and a cam. The cover is movable between an open position at which the opening is open and a closed position at which the opening is closed. Each of the first exposing head and the second exposing head is rotatably coupled to the cover. The first exposing head includes a first boss having a cylindrical shape. The second exposing head incudes a second boss having a cylindrical shape. The cam is movable with respect to the cover based on movement of the cover. The cam includes a first hole into which the first boss fits and a second hole into which the second boss fits. The first hole has an oval shape that is greater than the first boss. The second hole has a circular shape that is the same diameter as the second boss.

In the image forming apparatus, when the cover moves from the closed position to the open position, the cam moves based on the movement of the cover, and, first, the second exposing head starts rotating so as to move closer to the cover, and then the first exposing head starts rotating so as to move closer to the cover.

SUMMARY OF THE INVENTION

In the conventional image forming apparatus, when the first exposing head and the second exposing head rotate by the movement of the cam, there is a possibility that the cam is pushed by the first boss and the second boss in a direction intersecting a movement direction of the cam. In this case, the movement of the cam becomes unstable, and, as a result, there is a possibility that postures of the first exposing head and the second exposing head at their rotation movements become unstable.

As a result of this, a space through which the first exposing head and the second exposing head pass when the cover moves between the closed position and the open position becomes larger, and there is a limit to reduction of the image forming apparatus in size.

An aspect of the disclosure relates to an image forming apparatus capable of moving the cam stably when the cover moves between the closed position and the open position, and reducing a space through which the first exposing head and the second exposing head pass.

In one aspect of the disclosure, an image forming apparatus includes a housing having an opening, a cover movable between an open position at which the opening is open and a closed position at which the opening is closed, a first photoconductive drum and a second photoconductive drum each disposed in the housing, a first exposing head having a first boss and rotatably coupled to the cover, a second exposing head having a second boss and rotatably coupled to the cover, and a cam (i.e., a link) rotatably coupled to each of the first exposing head and the second exposing head and movable with respect to the cover based on movement of the cover. The cam is configured to rotate each of the first exposing head and the second exposing head with respect to the cover when the cover moves. The cam includes (i) a first elongated hole into which the first boss fits and extending a direction intersecting a movement direction in which the cam moves and (ii) a second elongated hole into which the second boss fits and extending in a direction intersecting the movement direction of the cam.

In another aspect of the disclosure, an image forming apparatus includes a housing having an opening, a cover movable between an open position at which the opening is open and a closed position at which the opening is closed, a first photoconductive drum and a second photoconductive drum each disposed in the housing, a first exposing head having a first boss and rotatably coupled to the cover, a second exposing head having a second boss and rotatably coupled to the cover, and a cam rotatably coupled to each of the first exposing head and the second exposing head and movable with respect to the cover based on movement of the cover. The cam is configured to rotate each of the first exposing head and the second exposing head with respect to the cover when the cover moves. The cam includes a first rib extending in a direction intersecting a movement direction in which the cam moves, a second rib extending in a direction intersecting the movement direction of the cam, the second rib being opposed to the first rib with a space, a third rib extending in the direction intersecting the movement direction of the cam, and a fourth rib extending in the direction intersecting the movement direction of the cam, the fourth rib being opposed to the third rib with a space. The first boss fits into between the first rib and the second rib, and the second boss fits into between the third rib and the fourth rib.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE INVENTION

1. Image Forming Apparatus

There will be described an image forming apparatus with reference to FIG. 1.

Figure 1:
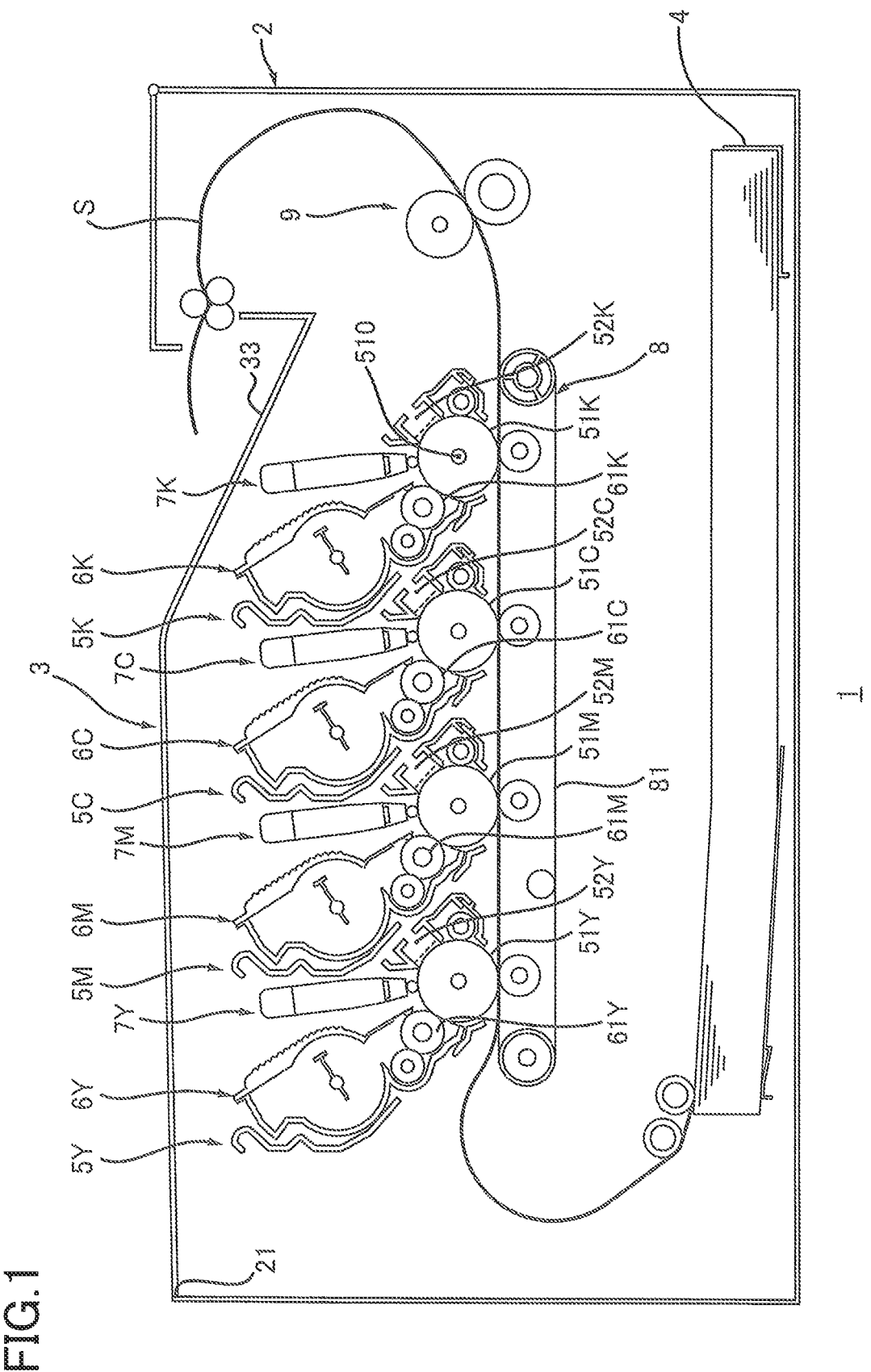
FIG. 1 is a schematic view of an image forming apparatus.

As illustrated in FIG. 1, the image forming apparatus 1 includes a housing 2, a cover 3, a sheet cassette 4, four drum cartridges 5Y, 5M, 5C, 5K, four exposing heads 7Y, 7M, 7C, 7K, four developing cartridges 6Y, 6M, 6C, 6K, a transfer unit 8, and a fixing unit 9.

1.1 Housing 2,

The housing 2 accommodates the sheet cassette 4, the four drum cartridges 5Y, 5M, 5C, 5K, the four exposing heads 7Y, 7M, 7C, 7K, four developing cartridges 6Y, 6M, 6C, 6K, the transfer unit 8, and the fixing unit 9.

Figure 4:
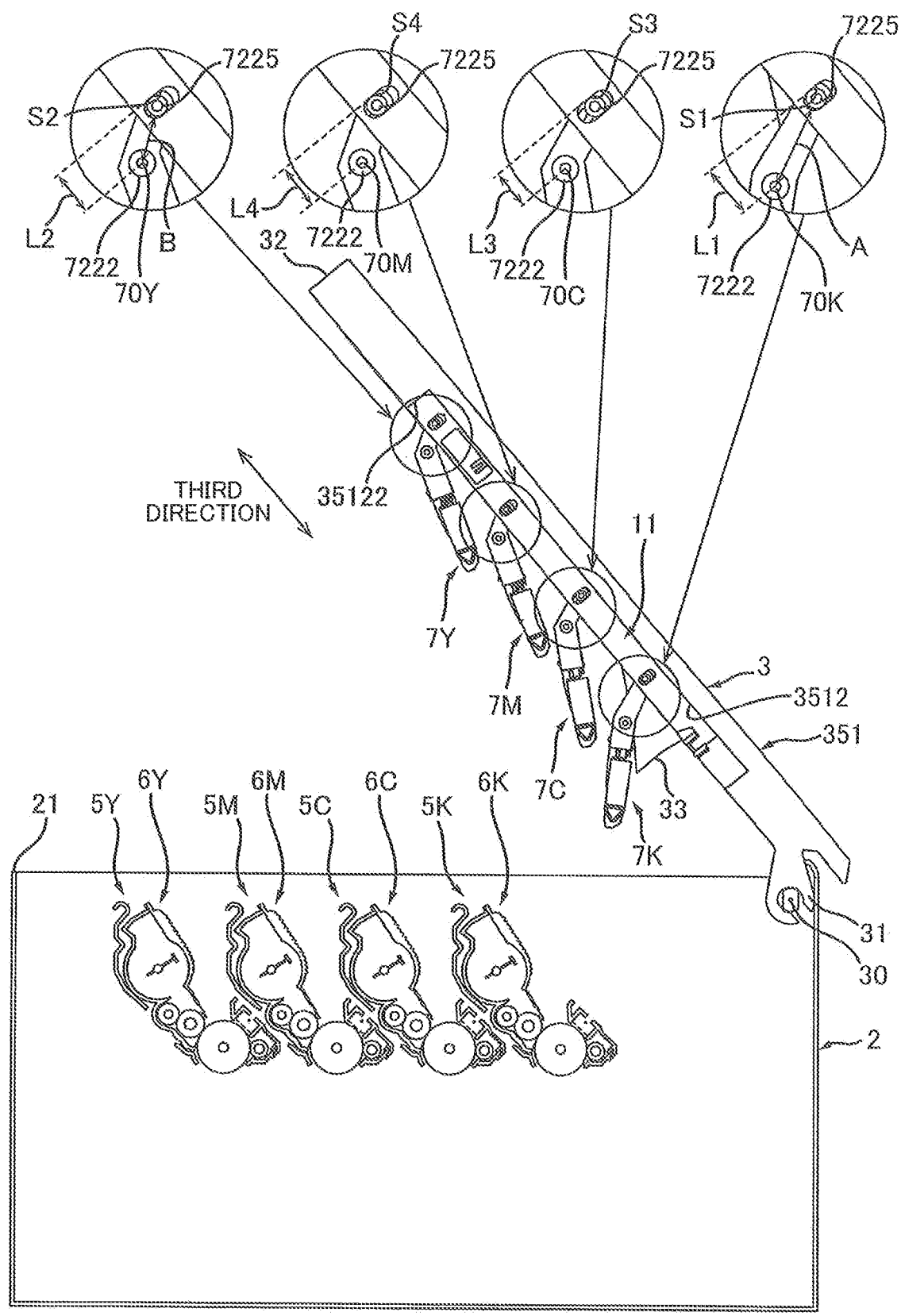
FIG. 4 is a view for explaining a state in which the cover in FIG. 1 is located at the open position.

The housing 2 includes an opening 21 (see FIG. 4). The opening 21 is located at an upper end of the housing 2.

1.2 Cover 3

The cover 3 opens and closes the opening 21. The cover 3 is movable between an open position (see FIG. 4) and a closed position (see FIG. 2). In a state in which the cover 3 is located at the open position, the opening 21 is open (see FIG. 4), In a state in which the cover 3 is located at the closed position, the cover 3 closes the opening 21 (see FIG. 2).

Figure 2:
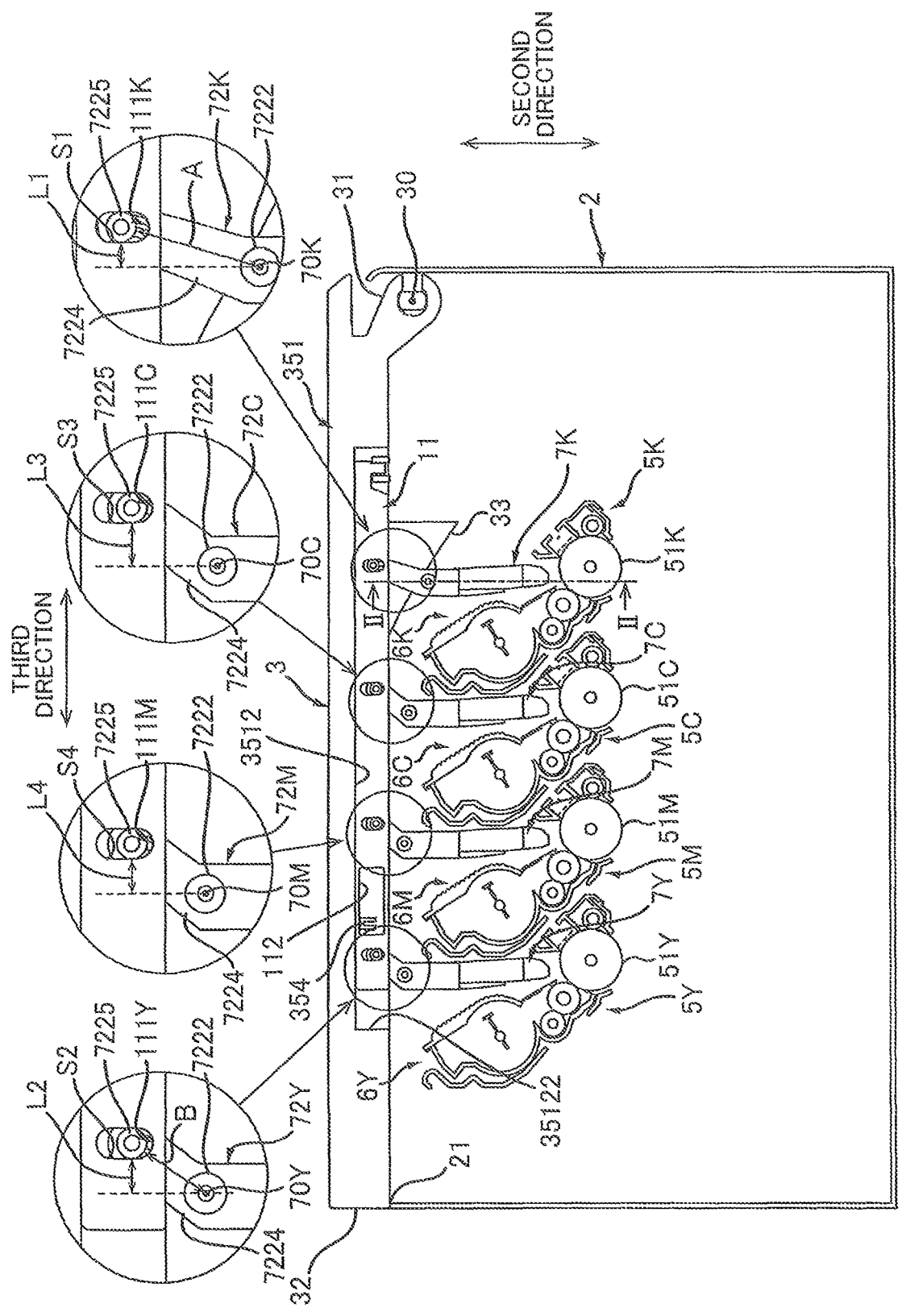
FIG. 2 is a view for explaining a state in which a cover in FIG. 1 is located at a closed position.

Specifically, the cover 3 is rotatable about a cover axis 30 between the open position (see FIG. 4) and the closed position (see FIG. 2). The cover axis 30 extends a first direction. The first direction intersects an up and down direction. The up and down direction is a direction of gravity at the time of placing the image forming apparatus 1 in a normal use state.

As illustrated in FIG. 2, the cover 3 has a thickness in a second direction. The second direction intersects the first direction. In the state in which the cover 3 is located at the closed position, the second direction is the same as the up and down direction. The cover 3 extends in a third direction. The third direction intersects the first direction and the second direction. The cover 3 includes a first end 31 and a second end 32. The first end 31 of the cover 3 is coupled to the housing 2. The second end 32 of the cover 3 is spaced apart from the first end 31 in the third direction. The second end 32 moves away from the housing 2 when the cover 3 rotates from the closed position to the open position (see FIG. 3 and FIG. 4).

As illustrated in FIG. 1, the cover 3 includes a discharge tray 33. The discharge tray 33 is located on an upper surface of the cover 3 in the state in which the cover 3 is located at the closed position. The discharge tray 33 is recessed inwardly with respect to the housing 2 in the state in which the cover 3 is located at the closed position.

1.3 Sheet Cassette 4

The sheet cassette 4 is capable of accommodating a sheet S. The sheet S in the sheet cassette 4 is conveyed toward a photoconductive drum 51K of the drum cartridge 5K. The photoconductive drum 51K will be described below.

1.4 Four Drum Cartridges 5Y, 5M, 5C, 5K

The four drum cartridges 5Y, 5M, 5C, 5K have the same configurations. Accordingly, the drum cartridge 5K will be explained, and explanations of the drum cartridge 5Y, 5M, 5C are dispensed with.

The drum cartridge 5K includes the photoconductive drum 51K and a charging unit 52K.

The photoconductive drum 51K extends in the first direction. The photoconductive drum 51K has a tubular shape. The photoconductive drum 51K is rotatable about a drum axis 510. The drum axis 510 extends in the first direction.

The charging unit 52K charges a peripheral surface of the photoconductive drum 51K. The charging unit 52K is, specifically, a scorotron type charging unit. It is noted that the charging unit 52K may be a charging roller.

In the state in which the cover 3 is located at the open position (see FIG. 4), the drum cartridge 5K is mountable on the housing 2 through the opening 21.

The drum cartridge 5Y includes the photoconductive drum 51Y and a charging unit 52Y. In the state in which the cover 3 is located at the open position (see FIG. 4), the drum cartridge 5Y is mountable on the housing 2 through the opening 21. The drum cartridge 5M includes the photoconductive drum 51M and a charging unit 52M. In the state in which the cover 3 is located at the open position (see FIG. 4), the drum cartridge 5M is mountable on the housing 2 through the opening 21. The drum cartridge 5C includes the photoconductive drum 51C and a charging unit 52C. In the state in which the cover 3 is located at the open position (see FIG. 4), the drum cartridge 5C is mountable on the housing 2 through the opening 21.

In a state in which the four drum cartridges 5Y, 5M, 5C, 5K are mounted on the housing 2, the four drum cartridges 5Y, 5M, 5C, 5K are arranged in order in a conveying direction of the sheet S conveyed by a conveyance belt 81. The conveying direction intersects the up and down direction and the first direction. The conveyance belt 81 will be described below.

In the state in which the four drum cartridges 5Y, 5M, 5C, 5K are mounted on the housing 2, the image forming apparatus 1 includes the four photoconductive drum 51Y, 51M, 51C, 51K. In the state in which the four drum cartridges 5Y, 5M, 5C, 5K are mounted on the housing 2, the four photoconductive drum 51Y, 51M, 51C, 51K are located in the housing 2.

It is noted that, in the present embodiment, the photoconductive drum 51K is an example of a first photoconductive drum, the photoconductive drum 51Y is an example of a second photoconductive drum, the photoconductive drum 51C is an example of a third photoconductive drum, and the photoconductive drum 51M is an example of a fourth photoconductive drum. Moreover, in the present embodiment, the drum cartridge 5K is an example of a first drum cartridge, the drum cartridge 5Y is an example of a second drum cartridge, and the drum cartridge 5C is an example of a third drum cartridge.

1.5 Four Exposing Heads 7Y, 7M, 7C, 7K

As illustrated in FIG. 2, the four exposing heads 7Y, 7M, 7C, 7K have the same configurations except relationships between shafts and bosses, which will be described below. Accordingly, the exposing head 7K will be explained, and explanations of the exposing head 7Y, 7M, 7C are dispensed with.

The exposing head 7K is rotatably coupled to the cover 3. The exposing head 7K is rotatable about a first axis 70K with respect to the cover 3. The first axis 70K extends in the first direction. The exposing head 7K is the nearest one of the four exposing heads 7Y, 7M, 7C, 7K which is located near to the first end 31. The first axis 70K of the exposing head 7K is located nearer to the first end 31 of the cover 3 than a first axis 70Y of the exposing head 7Y in the third direction. In the state in which the cover 3 is located at the closed position, the exposing head 7K is capable of exposing a peripheral surface of the photoconductive drum 51K.

The exposing head 7Y is rotatably coupled to the cover 3. The exposing head 7Y is rotatable about the first axis 70Y with respect to the cover 3. The first axis 70Y extends in the first direction. The exposing head 7Y is the nearest one of the four exposing heads 7Y, 7M, 7C, 7K which is located near to the second end 32. In the state in which the cover 3 is located at the closed position, the exposing head 7Y is capable of exposing a peripheral surface of the photoconductive drum 51Y.

The exposing head 7M is rotatably coupled to the cover 3. The exposing head 7M is rotatable about a first axis 70M. The first axis 70M extends in the first direction. The first axis 70M of the exposing head 7M is located at a position opposite to the second end 32 with respect to the first axis 70Y of the exposing head 7Y in the third direction. In the state in which the cover 3 is located at the closed position, the exposing head 7M is capable of exposing a peripheral surface of the photoconductive drum 51M.

The exposing head 7C is rotatably coupled to the cover 3. The exposing head 7C is rotatable about a first axis 70C with respect to the cover 3. The first axis 70C extends in the first direction. The first axis 70C of the exposing head 7C is located between the first axis 70M of the exposing head 7M and the first axis 70K of the exposing head 7K in the third direction.

It is noted that, in the present embodiment, the exposing head 7K is an example of a first exposing head, the exposing head 7Y is an example of a second exposing head, the exposing head 7C is an example of a third exposing head, and the exposing head 7M is an example of a fourth exposing head.

1.6 Four Developing Cartridges 6Y, 6M, 6C, 6K

As illustrated in FIG. 1, the four developing cartridge 6Y, 6M, 6C, 6K have the same configurations. Accordingly, the developing cartridge 6K will be explained, and explanations of the developing cartridge 6Y, 6M, 6C are dispensed with.

The developing cartridge 6K is mountable on and detachable from the drum cartridge 5K. The developing cartridge 6K accommodates toner. The developing cartridge 6K includes a developing roller 61K. The developing roller 61K extends in the first direction. In a state in which the developing cartridge 6K is mounted on the drum cartridge 5K, the developing roller 61K supplies the toner to the photoconductive drum 51K.

The developing cartridge 6Y is mountable on and detachable from the drum cartridge 5Y. The developing cartridge 6Y includes a developing roller 61Y. In a state in which the developing cartridge 6Y is mounted on the drum cartridge 5Y, the developing roller 61Y supplies toner to the photoconductive drum 51Y.

The developing cartridge 6M is mountable on and detachable from the drum cartridge 5M. The developing cartridge 6M includes a developing roller 61M. In a state in which the developing cartridge 6M is mounted on the drum cartridge 5M, the developing roller 61M supplies toner to the photoconductive drum 51M.

The developing cartridge 6C is mountable on and detachable from the drum cartridge 5C. The developing cartridge 6C includes a developing roller 61C. In a state in which the developing cartridge 6C is mounted on the drum cartridge 5C, the developing roller 61C supplies toner to the photoconductive drum 51C.

1.7 Transfer Unit 8

The transfer unit 8 includes the conveyance belt 81. The conveyance belt 81 conveys the sheet S conveyed from the sheet cassette 4 toward the fixing unit 9. The sheet S conveyed by the conveyance belt 81 passes between the transfer unit 8 and the photoconductive drum 51Y, 51M, 51C, 51K. At this time, the transfer unit 8 transfers toner on the photoconductive drum 51Y, 51M, 51C, 51K onto the a sheet S.

1.9 Fixing Unit 9

The fixing unit 9 fixes the toner on the sheet S by heating and pressurizing the sheet S on which the toner is transferred. The sheet S having passed through the fixing unit 9 is discharged to the discharge tray 33.

2. Details of Exposing Head 7K

There will be described next the exposing head 7K with reference to FIG. 2 to FIG. 5.

Figure 5:
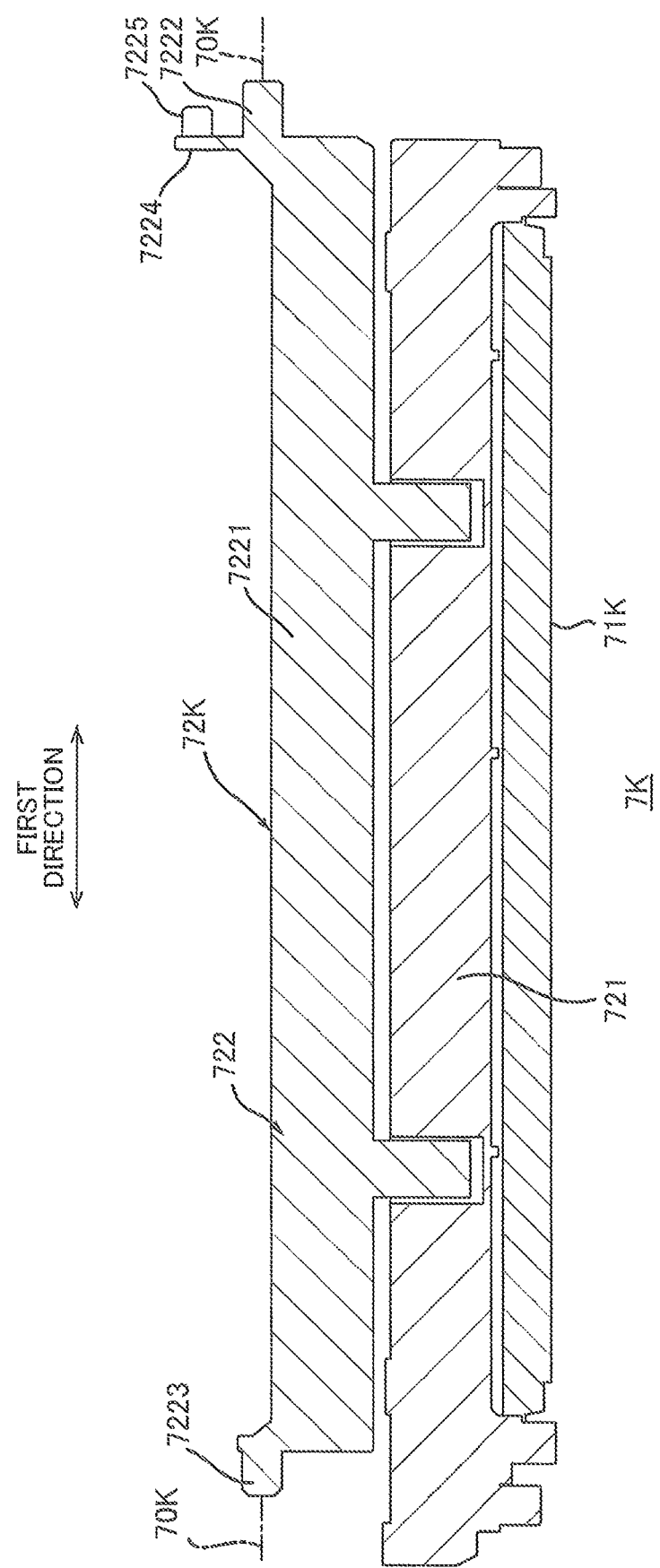
FIG. 5 is a cross-sectional view of an exposing head, taken along line II-II in FIG. 2.

As illustrated in FIG. 5, the exposing head 7K includes an emitter 71K and a frame 72K.

2.1 Emitter 71K

The emitter 71K exposes the photoconductive drum 51K. The emitter 71K is, specifically, a LED print head. The emitter 71K is an example of a first emitter.

2.2 Frame 72K

The frame 72K includes a first holder 721 and a second holder 722.

The first holder 721 supports the emitter 71K. In other words, the frame 72K supports the emitter 71K. The first holder 721 extends in the first direction.

The second holder 722 is located at a position opposite to the emitter 71K with respect to the first holder 721. The second holder 722 supports the first holder 721. The second holder 722 is coupled to the cover 3. The second holder 722 includes a body 7221, two shafts 7222, 7223, an arm 7224, and a boss 7225. In other words, the frame 72K of the exposing head 7K includes the boss 7225. The boss 7225 of the exposing head 7K is an example of a first boss.

The body 7221 extends in the first direction. The body 7221 supports the first holder 721.

The shaft 7222 is located at one end of the body 7221 in the first direction. The shaft 7222 extends in the first direction. The shaft 7222 protrudes from the body 7221. The shaft 7222 has a cylindrical shape. A central axis of the shaft 7222 is identical with the first axis 70K.

The shaft 7223 is located at the other end of the body 7221 in the first direction. The shaft 7223 extends in the first direction. The shaft 7223 protrudes from the body 7221. The shaft 7223 has a cylindrical shape. A central axis of the shaft 7223 is identical with the first axis 70K.

The arm 7224 is located the one end of the body 7221 in the first direction. The arm 7224 is located at a position opposite to the first holder 721 with respect to the body 7221. The arm 7224 protrudes from the body 7221 toward the cover 3 (see FIG. 2).

The boss 7225 is provided at the arm 7224. The boss 7225 is located at a position opposite to the shaft 7223 with respect to the arm 7224 in the first direction. The boss 7225 extends in the first direction. The boss 7225 protrudes from the arm 7224. The boss 7225 has a cylindrical shape.

2.3 First Position and Second Position of Exposing Head 7K

Figure 3:
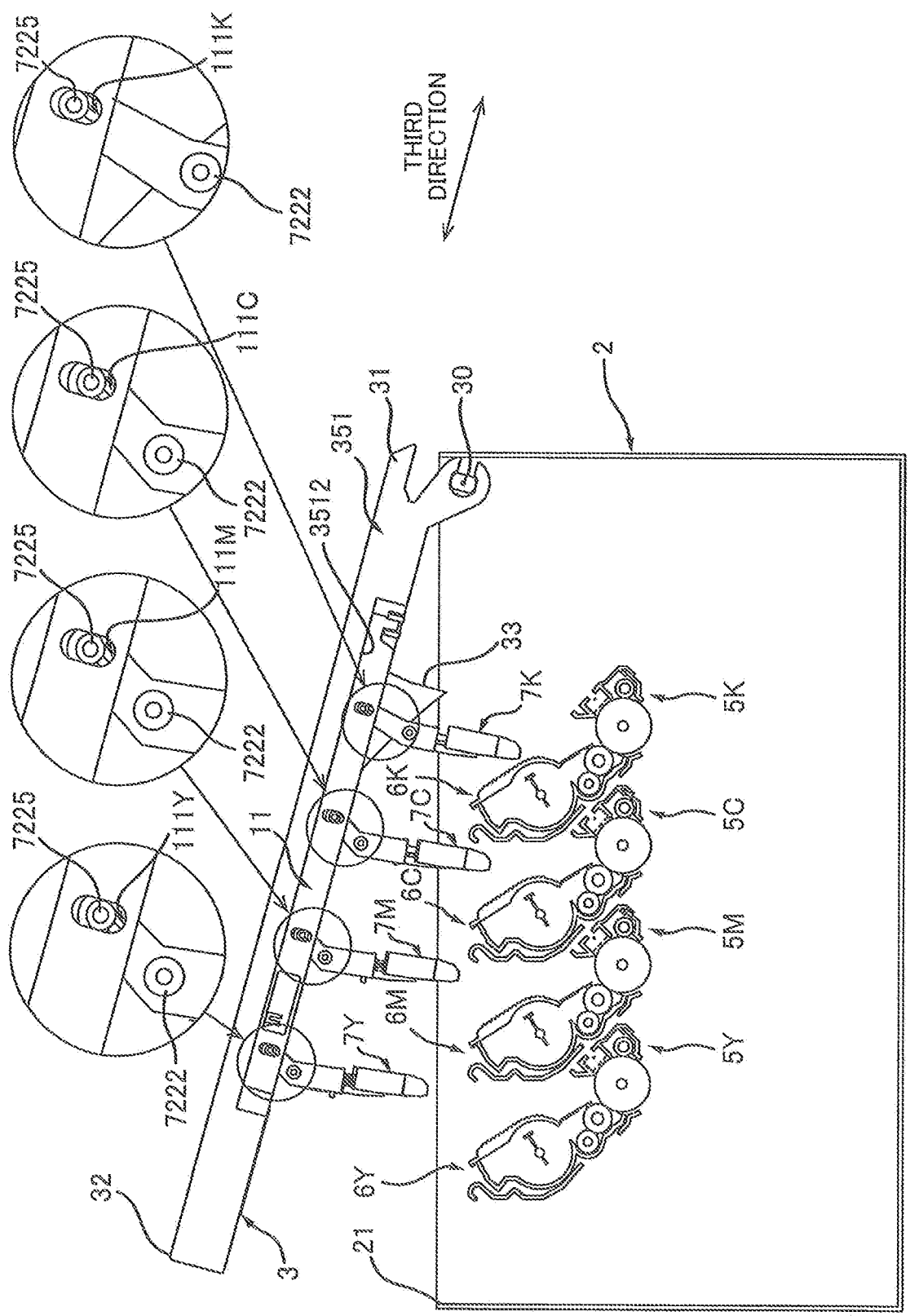
FIG. 3 is a view for explaining a state in which the cover in FIG. 1 is located between the closed position and an open position.

As illustrated in FIGS. 2 to 4, the exposing head 7K is rotatable between a first position (see FIG. 2) and a second position (see FIG. 4) based on the movement of the cover 3.

As illustrated in FIG. 2, in the state in which the cover 3 is located at the closed position, the exposing head 7K is located at the first position. In a state in which the exposing head 7K is located at the first position, the exposing head 7K is capable of exposing the photoconductive drum 51K. In a state in which the exposing head 7K is located at the first position, the exposing head 7K is located between the discharge tray 33 and the photoconductive drum 51K so as to oppose to the photoconductive drum 51K in the up and down direction.

As illustrated in FIG. 4, in the state in which the cover 3 is located at the open position, the exposing head 7K is located at the second position. In a state in which the exposing head 7K is located at the second position, the exposing head 7K is folded with respect to the cover 3. When the exposing head 7K moves from the first position to the second position, the emitter 71K rotates in a direction in which the emitter 71K moves closer to the first end 31 of the cover 3.

3. Exposing Head 7Y, 7M, 7C

As illustrated in FIG. 2, each of the exposing head 7Y, 7M, 7C can be explained as similar to the exposing head 7K.

Specifically, the exposing head 7Y includes an emitter 71Y and a frame 72Y. The emitter 71Y exposes the photoconductive drum 51Y. The emitter 71Y is an example of a second emitter. The frame 72Y supports the emitter 71Y. The frame 72Y includes two shafts 7222, 7223, the arm 7224 and the boss 7225. In other words, the exposing head 7Y includes the boss 7225. The boss 7225 of the exposing head 7Y is an example of a second boss. The exposing head 7Y is movable, as similar to the exposing head 7K, between the first position (see FIG. 2) and the second position (see FIG. 4).

The exposing head 7M includes an emitter 71M and a frame 72M. The emitter 71M exposes the photoconductive drum 51M. The frame 72M supports the emitter 71M. The frame 72M includes the two shafts 7222, 7223, the arm 7224 and the boss 7225. In other words, the exposing head 7M includes the boss 7225. The boss 7225 of the exposing head 7M is an example of a fourth boss. The exposing head 7M is movable, as similar to the exposing head 7K, between the first position (see FIG. 2) and the second position (see FIG. 4).

The exposing head 7C includes an emitter 71C and a frame 72C. The emitter 71C exposes the photoconductive drum SIC. The frame 72C supports the emitter 71C. The frame 72C includes the two shafts 7222, 7223, the arm 7224 and the boss 7225. In other words, the exposing head 7C includes the boss 7225. The boss 7225 of the exposing head 7C is an example of a third boss. The exposing head 7C is movable, as similar to the exposing head 7K, between the first position (see FIG. 2) and the second position (see FIG. 4).

In the state in which the cover 3 is located at the closed position, all of the four exposing heads 7Y, 7M, 7C, 7K are located at the first position. In a state in which the exposing head 7Y is located at the first position, the exposing head 7Y is located between the developing cartridge 6Y and the drum cartridge 5M. In a state in which the exposing head 7M is located at the first position, the exposing head 7M is located between the developing cartridge 6M and the drum cartridge 5C. In a state in which the exposing head 7C is located at the first position, the exposing head 7C is located between the developing cartridge 6C and the drum cartridge 5K. In a state in which the exposing head 7K is located at the first position, the exposing head 7K is located between the developing cartridge 6K and the first end 31 of the cover 3.

As illustrated in FIG. 4, in the state in which the cover 3 is located at the open position, all of the four exposing head 7Y, 7M, 7C, 7K are located at the second position. In the state in which the cover 3 is located at the open position, a distance A between the first axis 70K of the exposing head 7K and the boss 7225 of the exposing head 7K is greater than a distance B between the first axis 70Y of the exposing head 7Y and the boss 7225 of the exposing head 7Y. The distance B between the first axis 70Y and the boss 7225 in the exposing head 7Y is the same as a distance between the first axis 70M and the boss 7225 in the exposing head 7M. A distance between the first axis 70C and the boss 7225 in the exposing head 7C is less than the distance A between the first axis 70K of the exposing head 7K and the boss 7225 of the exposing head 7K, and greater than the distance B between the first axis 70Y of the exposing head 7Y and the boss 7225 of the exposing head 7Y.

Accordingly, when the cover 3 moves from the closed position to the open position, it is possible that a folding amount of the exposing head 7K becomes less than a folding amount of the exposing head 7Y at the time when the cover 3 is located at the open position, even if the exposing head 7K and the exposing head 7Y are started rotating simultaneously. As a result, it is possible to place other parts at an area near to the exposing head 7K. Specifically, it is possible to place the discharge tray 33 at an area near to the exposing head 7K, and in the state in which the cover 3 is located at the open position, the exposing head 7K is not in contact with the discharge tray 33.

Moreover, the distance B between the first axis 70Y and the boss 7225 in the exposing head 7Y is the same as a distance between the first axis 70M and the boss 7225 in the exposing head 7M. A distance between the first axis 70C and the boss 7225 in the exposing head 7C is less than the distance A between the first axis 70K of the exposing head 7K and the boss 7225 of the exposing head 7K, and greater than the distance B between the first axis 70Y of the exposing head 7Y and the boss 7225 of the exposing head 7Y.

In the state in which the cover 3 is located at the open position, the folding amount of the exposing head 7K with respect to the cover 3 is less than the folding amount of the exposing head 7Y with respect to the cover 3, and the exposing head 7K is not in contact with the discharge tray 33. In the state in which the cover 3 is located at the open position, the folding amount of the exposing head 7Y with respect to the cover 3 is the same as the folding amount of the exposing head 7M with respect to the cover 3. In the state in which the cover 3 is located at the open position, the folding amount of the exposing head 7C with respect to the cover 3 is greater than the folding amount of the exposing head 7K with respect to the cover 3, and less than the folding amount of the exposing head 7Y with respect to the cover 3.

4. Details of Cover 3

There will be described next details of the cover 3 with reference to FIG. 6 and FIG. 7.

Figure 6:
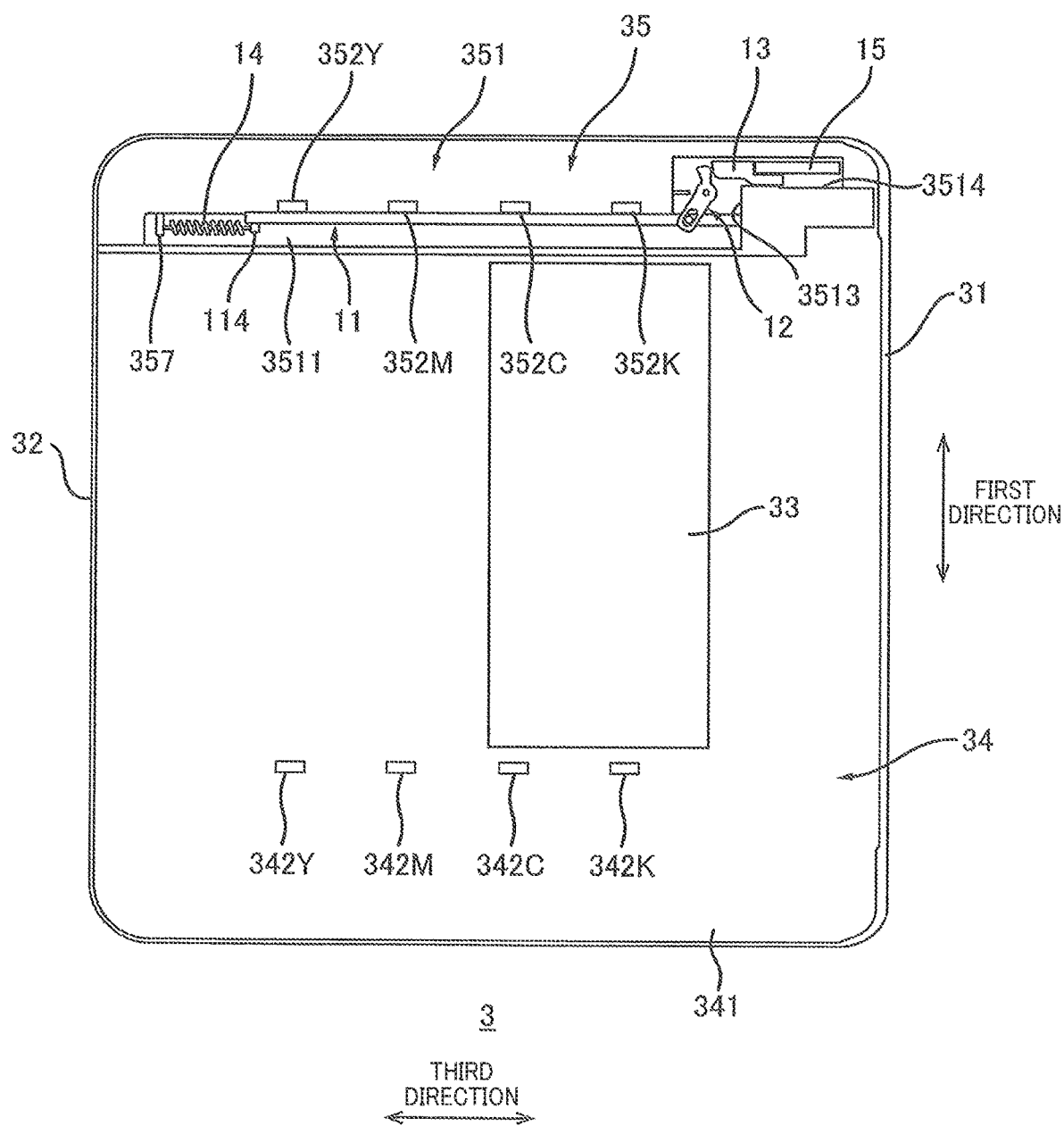
FIG. 6 is a bottom view of the cover in FIG. 2.

As illustrated in FIG. 6, the cover 3 includes a main cover 34 and a side cover 35.

4.1 Main Cover 34

The main cover 34 includes a main frame 341 and four fist bearings 342Y, 342M, 342C, 342K.

The main frame 341 includes the discharge tray 33. In the state in which the cover 3 is located at the closed position, the main frame 341 constitutes an upper surface of the housing 2.

The four fist bearings 342Y, 342M, 342C, 342K are supported by the main frame 341. The four fist bearing 342Y, 342M, 342C, 342K are spaced apart from one another in the third direction, Each of the four fist bearings 342Y, 342M, 342C, 342K protrudes from the main frame 341 in the second direction. Not illustrating, the fist bearing 342Y rotatably supports the shaft 7223 of the exposing head 7Y, the fist bearing 342M rotatably supports the shaft 7223 of the exposing head 7M, the fist bearing 342C rotatably supports the shaft 7223 of the exposing head 7C, and the fist bearing 342K rotatably supports the shaft 7223 of the exposing head 7K.

4.2 Side Cover 35

The side cover 35 and the main cover 34 are arranged in the first direction. The side cover 35 supports a link 11, a lever 12, a link 13, and a spring 14. In other words, the cover 3 supports the link 11, the lever 12, the link 13, and the spring 14. The link 11, the lever 12, the link 13, and the spring 14 will be described below.

Figure 7:
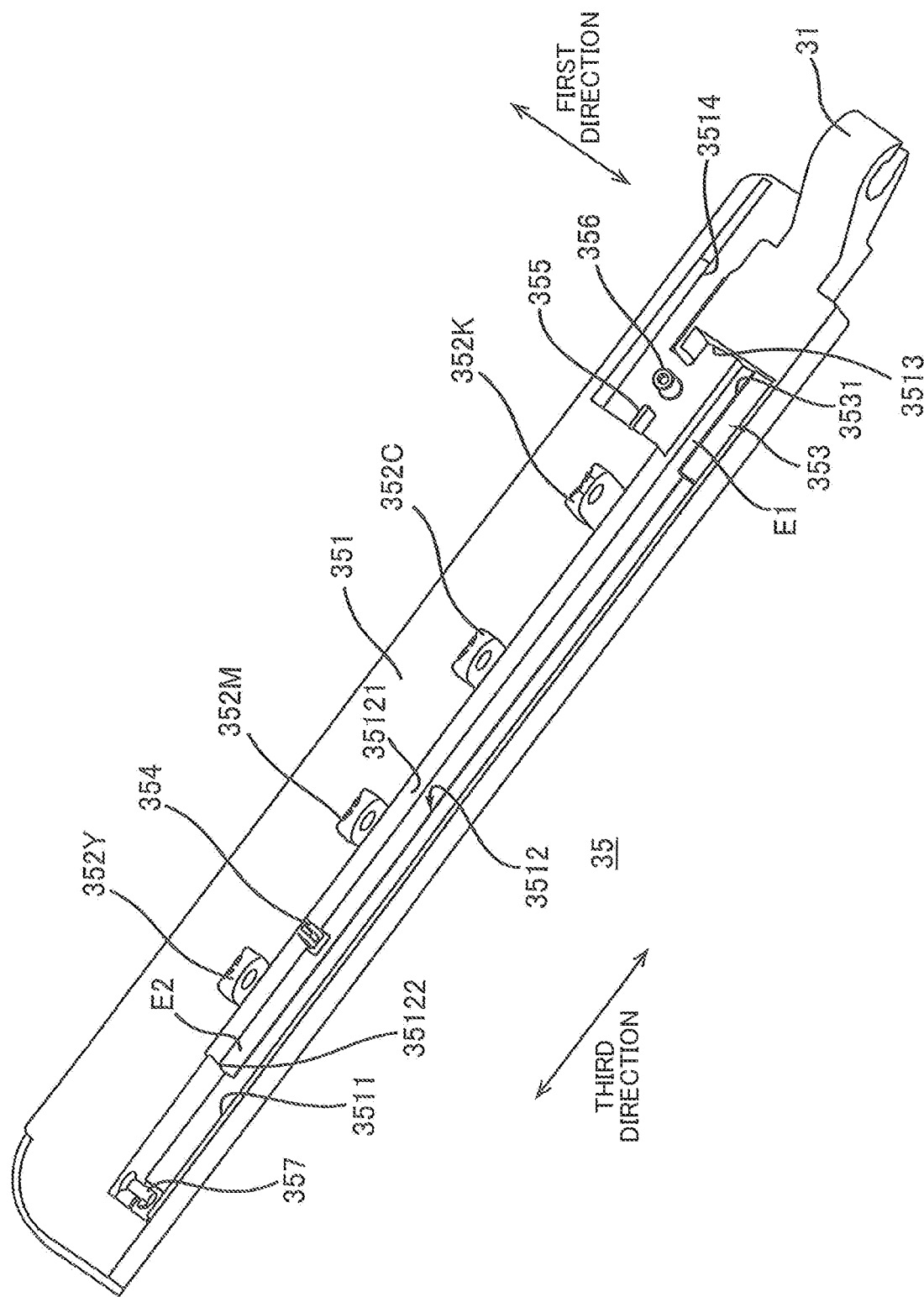
FIG. 7 is a perspective view of a side cover in FIG. 6.

As illustrated in FIG. 7, the side cover 35 includes a side frame 351, a guide 353, a stopper 354, a lever stopper 355, a lever boss 356, a spring support boss 357, and the four second bearings 352Y, 352M, 352C, 352K. In other words, the cover 3 includes the stopper 354.

4.2.1 Side Frame 351

The side frame 351 is supported by the main frame 341. The side frame 351 extends in the third direction. One end portion of the side frame 351 in the third direction is the first end 31 of the cover 3, and rotatably coupled to the housing 2.

The side frame 351 includes a first groove 3511, a second groove 3512, a third groove 3513, and a fourth groove 3514.

The link 11 and the spring 14 are accommodated in the first groove 3511 (see FIG. 6). The first groove 3511 is receded in the second direction. In the state in which the cover 3 is located at the closed position, the first groove 3511 is recessed upward from a lower surface of the side frame 351. The first groove 3511 extends in the third direction.

The second groove 3512 guides movement of the link 11. The second groove 3512 is disposed in the first groove 3511. The second groove 3512 is recessed in the first direction from an inner surface, of the first groove 3511, which is orthogonal to the first direction, and the second groove 3512 is recessed in the second direction from an inner surface, of the first groove 3511, which is orthogonal to the second direction. The second groove 3512 extends in the third direction. The second groove 3512 includes one end E1 and the other end E2 in the third direction. The other end E2 of the second groove 3512 is spaced apart from the one end E1 in the third direction. The other end E2 of the second groove 3512 is located at a position opposite to the first end 31 of the cover 3 with respect to the one end E1 in the third direction.

The second groove 3512 includes a first guide surface 35121 and a cover second surface 35122. In other words, the cover 3 includes the first guide surface 35121 and the cover second surface 35122.

Figure 8:
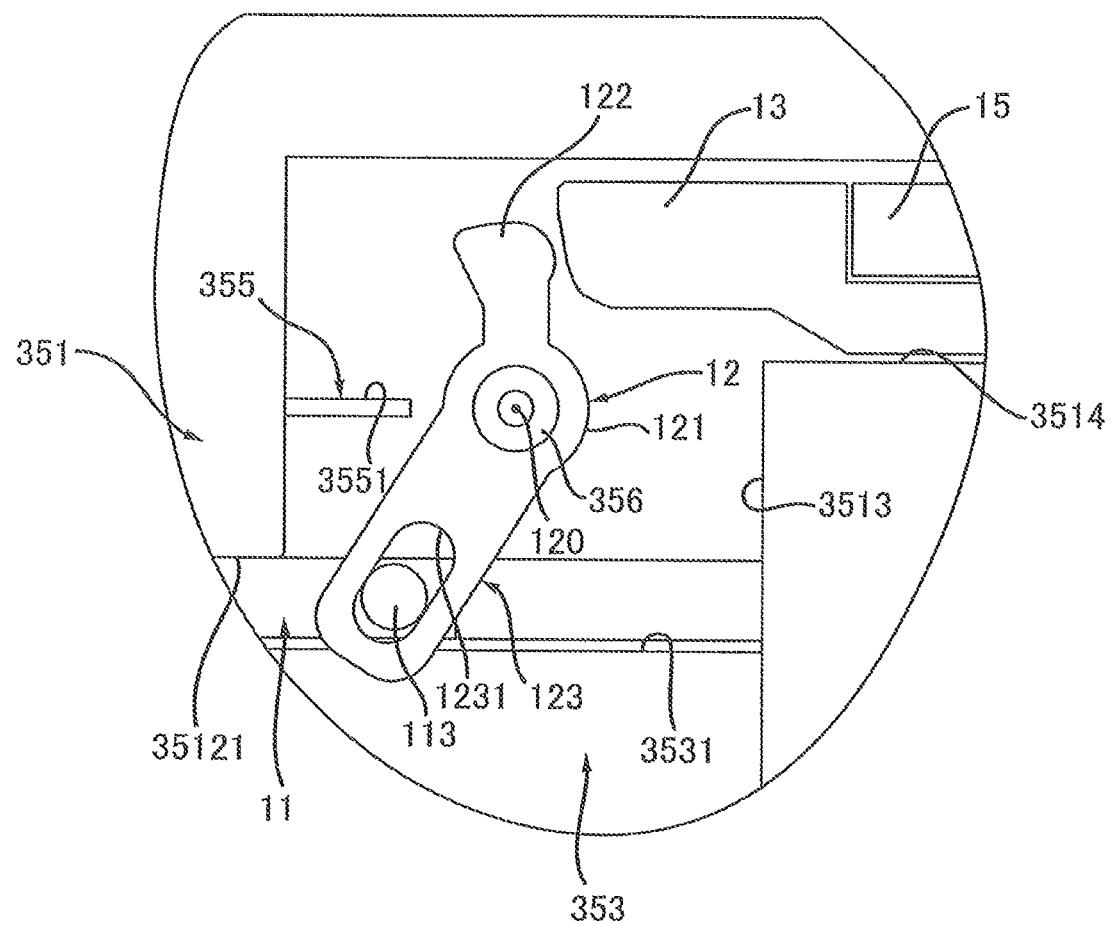
FIG. 8 is an enlarged view of a lever in FIG. 6 in the state in which the cover is located at the open positon.
Figure 9:
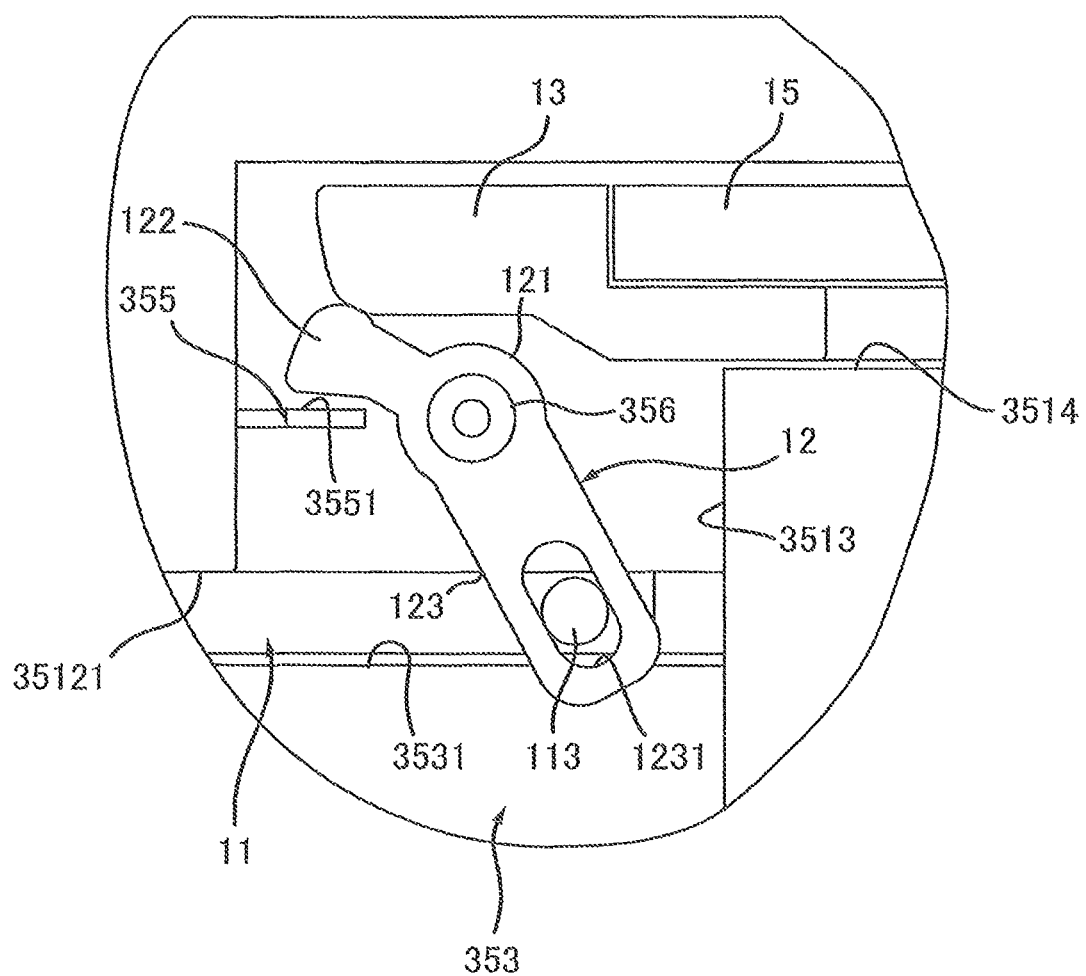
FIG. 9 is an enlarged view of the lever in FIG. 6 in the state in which the cover is located at the closed position.

The first guide surface 35121 stops movement of the link 11 in the first direction (see FIG. 8 and FIG. 9). The first guide surface 35121 guides movement of the link 11 in the third direction (see FIG. 8 and FIG. 9). Accordingly, when the link 11 moves based on the movement of the cover 3, it is possible to smoothly move the link 11 in the third direction while suppressing movement of the link 11 in the first direction. Accordingly, it is possible to move the link 11 more stably, as a result, it is possible to more stabilize postures of the four exposing heads 7Y, 7M, 7C, 7K at their rotation movements.

The first guide surface 35121 is an inner surface, of the second groove 3512, which is orthogonal to the first direction. The first guide surface 35121 extends in the second direction and the third direction.

The cover second surface 35122 stops movement of the link 11 when the cover 3 moves from the closed position to the open position (see FIG. 4). The cover second surface 35122 is located at the other end E2 of the second groove 3512. The cover second surface 35122 extends in the first direction and the second direction.

The lever 12 is accommodated in the third groove 3513 (see FIG. 6). The third groove 3513 communicates with the one end E1 of the second groove 3512 in the first direction. In other words, the third groove 3513 continues to the second groove 3512. The third groove 3513 is recessed in the second direction.

The link 13 is accommodated in the fourth groove 3514 (see FIG. 6). The fourth groove 3514 is located between the third groove 3513 and the first end 31 of the cover 3 in the third direction. The fourth groove 3514 communicates with the third groove 3513 in the third direction. In other words, the fourth groove 3514 continues to the third groove 3513. The fourth groove 3514 is recessed in the second direction.

4.2.2 Guide 353

The guide 353 is provided in the first groove 3511. The guide 353 is located at a position opposite to the third groove 3513 with respect to the one end E1 of the second groove 3512 in the first direction. The guide 353 protrudes in the second direction from an inner surface, of the first groove 3511, which is orthogonal to the second direction. The guide 353 extends in the third direction. The guide 353 includes a second guide surface 3531.

As illustrated in FIG. 8, the second guide surface 3531 stops movement of the link 11 in the first direction. The second guide surface 3531 guides movement of the link 11 in the third direction. The second guide surface 3531 is a side surface, of the guide 353, which is orthogonal to the first direction. The second guide surface 3531 extends in the second direction and the third direction.

4.2.3 Stopper 354

The stopper 354 stops movement of the link 11 in the second direction (see FIG. 2). As a result, it is possible to move the link 11 in the third direction while suppressing movement of the link 11 in the second direction. As illustrated in FIG. 7, the stopper 354 is provided at the first guide surface 35121 of the second groove 3512. The stopper 354 protrudes from the first guide surface 35121 in the first direction. The stopper 354 is spaced apart from the cover second surface 35122 in the third direction.

4.2.4 Lever Stopper 355

As illustrated in FIG. 9, the lever stopper 355 stops rotation of the lever 12 when the cover 3 moves from the open position to the closed position. The lever stopper 355 is provided in the third groove 3513. The lever stopper 355 protrudes in the second direction from an inner surface, of the third groove 3513, which is orthogonal to the second direction. The lever stopper 355 extends in the third direction. The lever stopper 355 includes a cover first surface 3551. In other words, the cover 3 includes the cover first surface 3551. The cover first surface 3551 stops rotation of the lever 12 when the cover 3 moves from the open position to the closed position. The cover first surface 3551 is a side surface, of the lever stopper 355, which is orthogonal to the first direction.

4.2.5 Lever Boss 356

The lever boss 356 rotatably supports the lever 12. The lever boss 356 is provided in the third groove 3513. The lever boss 356 is spaced apart from the lever stopper 355 in the third direction. The lever boss 356 extends in the second direction from an inner surface, of the third groove 3513, which is orthogonal to the second direction. The lever boss 356 has a cylindrical shape.

4.2.6 Spring Support Boss 357

As illustrated in FIG. 7, the spring support boss 357 supports the spring 14 (see FIG. 6). The spring support boss 357 is provided in the first groove 3511. The spring support boss 357 is located at a position opposite to the stopper 354 with respect to the cover second surface 35122 in the third direction. The spring support boss 357 extends in the first direction from an inner surface, of the first groove 3511, which is orthogonal to the first direction. The spring support boss 357 has a cylindrical shape.

4.2.7 Four Second Bearings 352Y, 352M, 352C, 352K

The four second bearings 352Y, 352M, 352C, 352K are spaced apart from one another in the third direction. Each of the four second bearings 352Y, 352M, 352C, 352K protrudes from the side frame 351 in the second direction.

The four second bearings 352Y, 352M, 352C, 352K have the same configurations except dimensions of which in the second direction. Accordingly, the second bearing 352K will be explained, and explanations of the second bearing 352Y, 352M, 352C are dispensed with.

Figure 10:
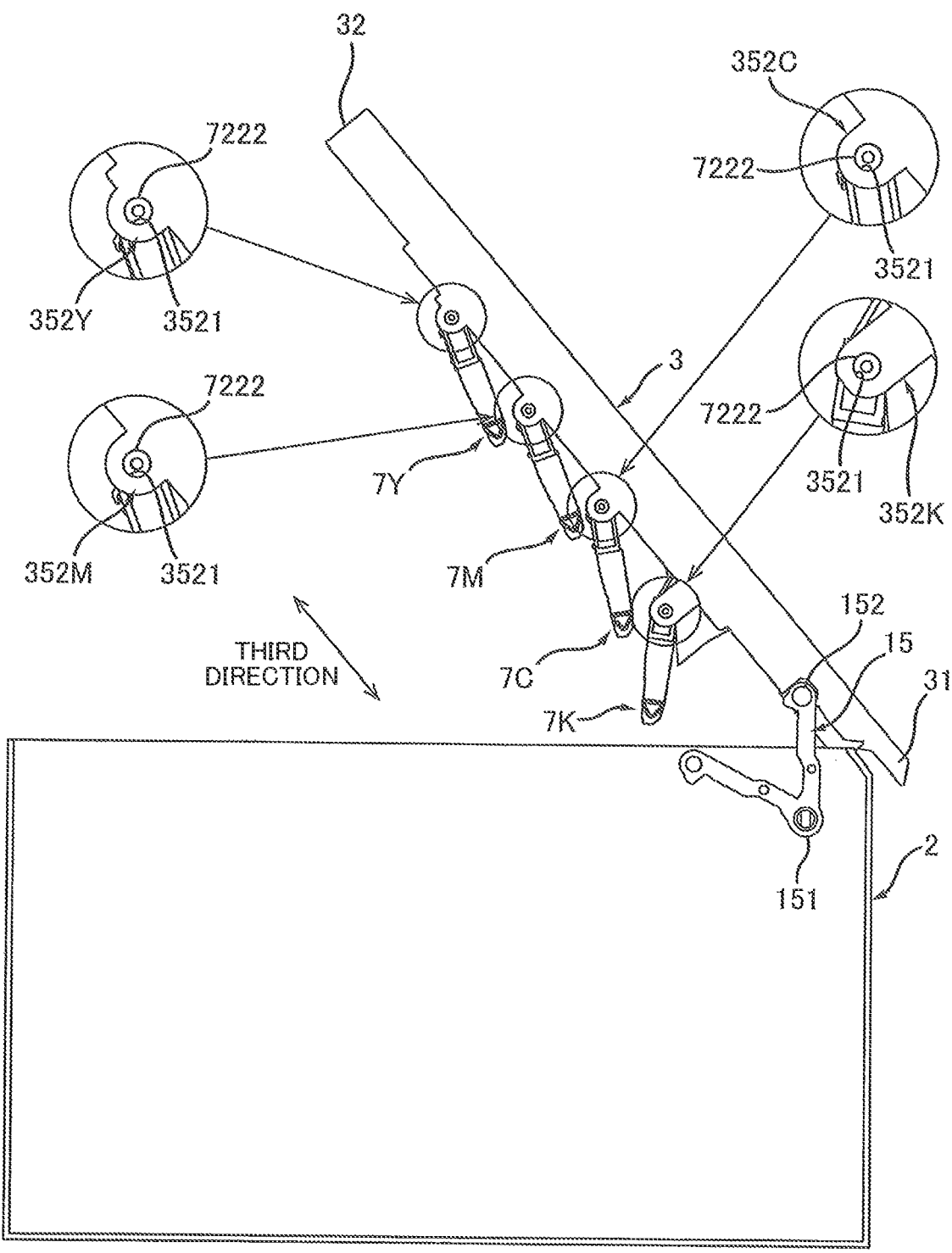
FIG. 10 is a view for explaining a link arm in FIG. 6 in the state in which the cover is located at the open position.

As illustrated in FIG. 10, the second bearing 352K rotatably supports a shaft 7222 of the exposing head 7K. The second bearing 352K is spaced apart from the fist bearing 342K in the first direction (see FIG. 6). The second bearing 352K includes a hole 3521. The shaft 7222 of the exposing head 7K fits into the hole 3521. The hole 3521 has a circular shape. An inside diameter of the hole 3521 is the same as an outside diameter of the shaft 7222. Accordingly, the exposing head 7K is rotatably supported by the cover 3 about the first axis 70K (see FIG. 2).

The second bearing 352Y is spaced apart from the fist bearing 342Y in the first direction (see FIG. 6). The second bearing 352Y rotatably supports the shaft 7222 of the exposing head 7Y. Accordingly, the exposing head 7Y is rotatably, about the first axis 70Y, supported by the cover 3 (see FIG. 2). It is noted that the dimension of the second bearing 352Y in the second direction is less than the dimension of the second bearing 352K in the second direction.

The second bearing 352M is spaced apart from the fist bearing 342M in the first direction (see FIG. 6). The second bearing 352M rotatably supports the shaft 7222 of the exposing head 7M. Accordingly, the exposing head 7M is rotatably, about the first axis 70M, supported by the cover 3 (see FIG. 2). It is noted that the dimension of the second bearing 352M in the second direction is the same as the dimension of the second bearing 352Y in the second direction.

The second bearing 352C is spaced apart from the fist bearing 342C in the first direction (see FIG. 6). The second bearing 352C rotatably supports the shaft 7222 of the exposing head 7C. Accordingly, the exposing head 7C is rotatably, about the first axis 70C, supported by the cover 3 (see FIG. 2). It is noted that the dimension of the second bearing 352C in the second direction is less than the dimension of the second bearing 352K in the second direction, and greater than the dimension of the second bearing 352Y in the second direction.

5. Details of Image Forming Apparatus

There will be described next the image forming apparatus 1 with reference to FIG. 6 and FIG. 11.

As illustrated in FIG. 6, the image forming apparatus 1 includes the link 11, the spring 14, the lever 12, the link 13, and a link arm 15 (see FIG. 10).

5.1 Link 11

As illustrated in FIG. 2 to FIG. 4, the link 11 is movable with respect to the cover 3 based on movement of the cover 3. The link 11 extends in the third direction.

The link 11 is disposed in the second groove 3512 of the side frame 351. The link 11 is located between the first guide surface 35121 and the second guide surface 3531 in the first direction (see FIG. 8). The link 11 is movable in the third direction along the first guide surface 35121.

The link 11 rotates the four exposing heads 7Y, 7M, 7C, 7K with respect to the cover 3 when the cover 3 moves. The link 11 is coupled to each of the four exposing heads 7Y, 7M, 7C, 7K.

As illustrated in FIG. 2, in the state in which the cover 3 is located at the closed position, the link 11 causes the four exposing heads 7Y, 7M, 7C, 7K to be located at the first position. In the state in which the cover 3 is located at the closed position, the link 11 is spaced apart from the cover second surface 35122 in the third direction.

As illustrated in FIG. 4, in the state in which the cover 3 is located at the open position, the link 11 causes all of the four exposing heads 7Y, 7M, 7C, 7K to be located at the second position. In the state in which the cover 3 is located at the open position, the link 11 is in contact with the cover second surface 35122 in the third direction.

Figure 11:
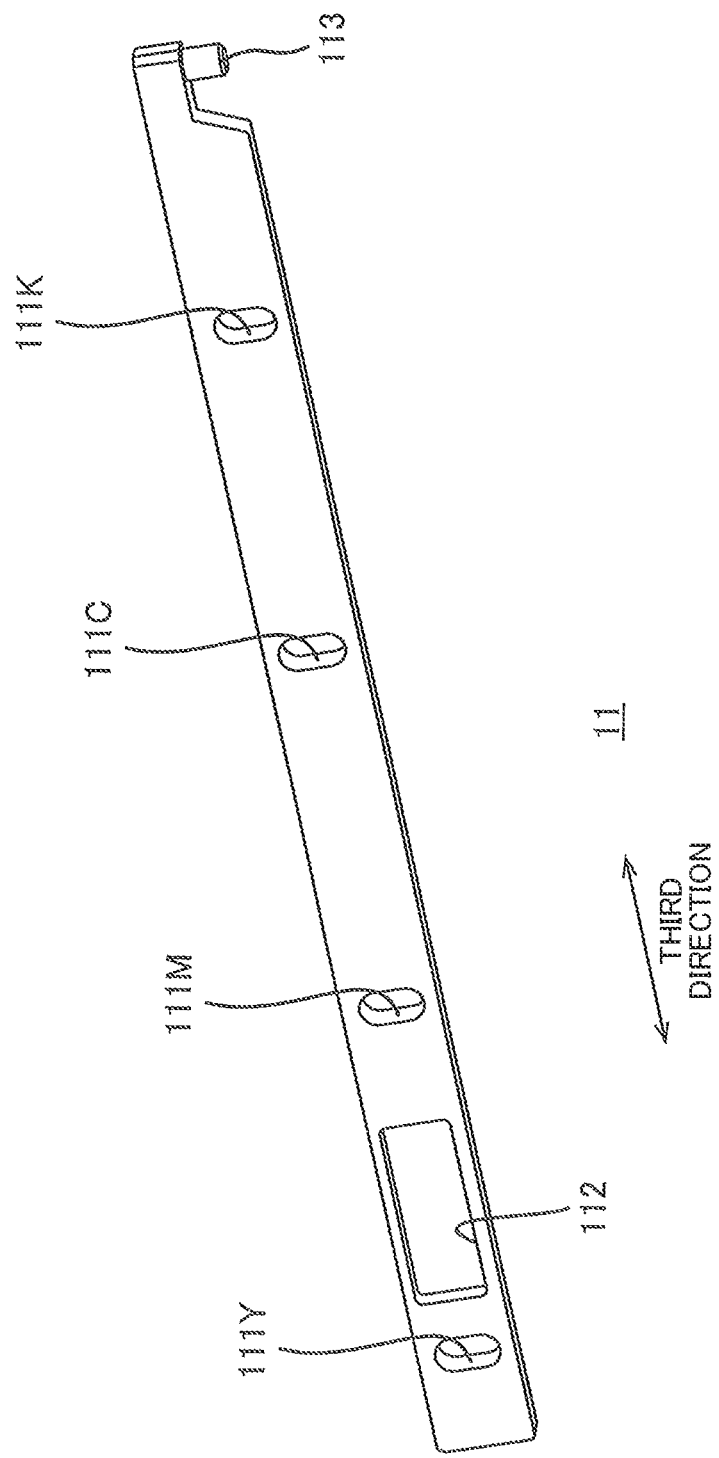
FIG. 11 is a perspective view of the link in FIG. 6.

As illustrated in FIG. 11, the link 11 includes four elongated holes 111Y, 111M, 111C, 111K, and a stopper groove 112. Moreover, the link 11 includes a lever coupling boss 113 and a spring coupling boss 114 (see FIG. 6).

5.1.1 Four Elongated Holes 111Y, 111M, 111C, 111K

The four elongated holes 111Y, 111M, 111C, 111K is spaced apart from one another in the third direction. Each of the four elongated holes 111Y, 111M, 111C, 111K penetrates the link 11 in the first direction. That is each of the four elongated holes 111Y, 111M, 111C, 111K is a through hole. The elongated hole 111K of the four elongated holes 111Y, 111M, 111C, 111K will be explained first, and next the elongated holes 111Y, 111M, 111C are explained in order.

As illustrated in FIG. 2, the elongated hole 111K is the nearest one of the four elongated holes 111Y, 111M, 111C, 111K which is located near to the first end 31 of the cover 3 in the third direction. The boss 7225 of the exposing head 7K fits into the elongated hole 111K. The elongated hole 111K extends in a direction intersecting the movement direction of the link 11. Specifically, the elongated hole 111K extends in the second direction intersecting the movement direction of the link 11. The direction in which the elongated hole 111K extends is preferably orthogonal to the movement direction of the link 11. The direction in which the elongated hole 111K extends being orthogonal to the movement direction of the link 11 means that an angle in which the direction in which the elongated hole 111K extends forms with the movement direction of the link 11 is within 90 degrees plus or minus 5 degrees. The elongated hole 111K is an example of a first elongated hole.

In the second direction intersecting the movement direction of the link 11, the dimension of the elongated hole 111K is greater than the dimension of the boss 7225 of the exposing head 7K. In the third direction that is the movement direction of the link 11, the dimension of the elongated hole 111K is the same as the dimension (outer diameter) of the boss 7225 of the exposing head 7K. Accordingly, the boss 7225 of the exposing head 7K fits into the elongated hole 111K with a play in the second direction.

The elongated hole 111K includes a first surface S1. The first surface S1 is located between the boss 7225 of the exposing head 7K and the second end 32 of the cover 3 in the third direction. The first surface S1 is a plane extending in the second direction. In other words, the first surface is orthogonal to the third direction.

The elongated hole 111Y is the nearest on of the four elongated holes 111Y, 111M, 111C, 111K which is located near to the second end 32 of the cover 3 in the third direction.

The elongated hole 111Y is located at a position opposite to the first end 31 of the cover 3 with respect to the elongated hole 111K in the third direction. The boss 7225 of the exposing head 7Y fits into the elongated hole 111Y. The elongated hole 111Y extends in a direction intersecting the movement direction of the link 11. Specifically, the elongated hole 111Y extends in the second direction intersecting the movement direction of the link 11. The direction in which the elongated hole 111Y extends is preferably orthogonal to the movement direction of the link 11. The elongated hole 111Y is an example of a second elongated hole.

In the second direction intersecting the movement direction of the link 11, the dimension of the elongated hole 111Y is greater than the dimension of the boss 7225 of the exposing head 7Y. In the third direction that is the movement direction of the link 11, the dimension of the elongated hole 111Y is the same as the dimension (outer diameter) of the boss 7225 of the exposing head 7Y. The elongated hole 111Y includes a second surface S2. The second surface S2 is located between the second end 32 of the cover 3 and the boss 7225 of the exposing head 7Y in the third direction. The second surface S2 is a plane extending in the second direction. In other words, the second surface S2 is orthogonal to the second surface S2.

In the state in which the cover 3 is located at the closed position, a distance L1 between the first axis 70K and the first surface S1 in the third direction is less than a distance L2 between the first axis 70Y and the second surface S2 in the third direction.

As illustrated in FIG. 4, in the state in which the cover 3 is located at the open position, the distance L1 between the first axis 70K and the first surface S1 in the third direction is greater than the distance L2 between the first axis 70Y and the second surface S2 in the third direction.

As a result, when the cover 3 moves between the closed position and the open position, it is possible to appropriately adjust postures of the exposing head 7K and the exposing head 7Y at their rotation movements. Specifically, when the cover 3 moves from the open position to the closed position, first, the exposing head 7K moves more slowly than the exposing head 7Y, and then the exposing head 7K moves more quickly than the exposing head 7Y. Accordingly, it is possible to adjust postures of the exposing heads 7Y, 7M, 7C, 7K with respect to the housing 2 at the movement of the cover 3 between the closed position and the open position, and adjust the postures individually for the exposing heads 7Y, 7M, 7C, 7K. It is possible to pull up each of the exposing heads 7Y, 7M, 7C, 7K from the housing 2 in the up and down direction, and insert each of the exposing heads 7Y, 7M, 7C, 7K into the housing 2 in the up and down direction. As a result, when the cover 3 moves between the closed position and the open position, it is possible to reduce space through which the exposing head 7K and the exposing head 7Y pass.

As illustrated in FIG. 2, the elongated hole 111M and the elongated hole 1 IC are located between the elongated hole 111Y and the elongated hole 111K in the third direction. The elongated hole 111M is located at a position opposite to the second end 32 of the cover 3 with respect to the elongated hole 111Y. The boss 7225 of the exposing head 7M fits into the elongated hole 111M. The elongated hole 111M extends in a direction intersecting the movement direction of the link 11. Specifically, the elongated hole 111M extends in the second direction intersecting the movement direction of the link 11. The direction in which the elongated hole 111M extends is preferably orthogonal to the movement direction of the link 11. The elongated hole 111M is an example of a fourth elongated hole.

In the second direction intersecting the movement direction of the link 11, the dimension of the elongated hole 111M is greater than the dimension of the boss 7225 of the exposing head 7M. In the third direction that is the movement direction of the link 11, the dimension of the elongated hole 111M is the same as the dimension (outer diameter) of the boss 7225 of the exposing head 7M.

The elongated hole 111M includes a fourth surface S4. The fourth surface S4 is located between the elongated hole 111Y and the boss 7225 of the exposing head 7M in the third direction. The fourth surface S4 is a plane extending in the second direction. In other words, the fourth surface S4 is orthogonal to the third direction.

In the state in which the cover 3 is located at the closed position, a distance L4 between the first axis 70M and the fourth surface S4 in the third direction is the same as the distance L2 between the first axis 70Y and the second surface S2 in the third direction.

As illustrated in FIG. 4, in the state in which the cover 3 is located at the open position, the distance 14 between the first axis 70M and the fourth surface S4 in the third direction is the same as the distance L2 between the first axis 70Y and the second surface S2 in the third direction.

As illustrated in FIG. 2, the elongated hole II IC is located between the elongated hole 111M and the elongated hole 111K in the third direction. The boss 7225 of the exposing head 7C fits into the elongated hole 111C. The elongated hole 111C extends in a direction intersecting the movement direction of the link 11. Specifically, the elongated hole 111C extending in the second direction intersecting the movement direction of the link 11, The direction in which the elongated hole 111C extends is preferably orthogonal to the movement direction of the link 11. The elongated hole 111C is an example of a third elongated hole.

In the second direction intersecting the movement direction of the link 11, the dimension of the elongated hole 111C is greater than the dimension of the boss 7225 of the exposing head 7C. In the third direction that is the movement direction of the link 11, the dimension of the elongated hole 111C is the same as the dimension (outer diameter) of the boss 7225 of the exposing head 7C.

The elongated hole 111C includes a third surface S3. The third surface S3 is located between the elongated hole 111M and the boss 7225 of the exposing head 7C in the third direction. The third surface S3 is a plane extending the second direction. In other words, the third surface S3 is orthogonal to the third direction.

In the state in which the cover 3 is located at the closed position, a distance L3 between the first axis 70C and the third surface S3 in the third direction is greater than the distance L1 between the first axis 70K and the first surface S1 in the third direction, and less than the distance L2 between the first axis 70Y and the second surface S2 in the third direction.

As illustrated in FIG. 4, in the state in which the cover 3 is located at the open position, the distance L3 between the first axis 70C and the third surface S3 in the third direction is less than the distance L1 between the first axis 70K and the first surface S1 in the third direction, and greater than the distance L2 between the first axis 70Y and the second surface S2 in the third direction.

As a result, when the cover 3 moves from the open position to the closed position, first, the exposing head 7C rotates more quickly than the exposing head 7K, and rotates more slowly than the exposing head 7Y. Then, the exposing head 7C rotates more slowly than the exposing head 7K, and rotates more quickly than the exposing head 7Y. Accordingly, when the cover 3 moves between the closed position and the open position, it is possible to pull up the exposing head 7C from the housing 2 in the up and down direction, and insert the exposing head 7C into the housing 2 in the up and down direction. As a result, when the cover 3 moves between the closed position and the open position, it is possible to reduce space through which the exposing head 7C passes.

5.1.2 Stopper Groove 112

As illustrated in FIG. 11, the stopper groove 112 is located between the elongated hole 111Y and the elongated hole 111M in the third direction. The stopper groove 112 is recessed in the first direction from a side surface, of the link 11, which is orthogonal to the first direction. As illustrated in FIG. 2, the stopper 354 is inserted into the stopper groove 112. The stopper 354 is in contact with an inner surface of the stopper groove 112 in the second direction. The stopper groove 112 extends in the third direction. The dimension of the stopper groove 112 in the third direction is greater than the dimension of the stopper 354 in the third direction. Accordingly, movement of the link 11 in the second direction is stopped, and the link 11 is allowed to move in the third direction.

5.1.3 Lever Coupling Boss 113

As illustrated in FIG. 8, the lever coupling boss 113 is coupled to the lever 12. As illustrated in FIG. 11, the lever coupling boss 113 is provided at one end portion of the link 11 in the third direction. The lever coupling boss 113 extends in the second direction. The lever coupling boss 113 has a cylindrical shape.

5.1.4 Spring Coupling Boss 114

As illustrated in FIG. 6, the spring coupling boss 114 is coupled to the spring 14. The spring coupling boss 114 is provided at the other end portion of the link 11 in the third direction. The spring coupling boss 114 extends in the first direction. The spring coupling boss 114 has a cylindrical shape.

5.2 Spring 14

The spring 14 pulls the link 11 toward the second end 32 of the cover 3. The spring 14 is a helical tension spring. The spring 14 includes a first end and a second end. The first end of the spring 14 is fixed to the spring support boss 357. The second end of the spring 14 is fixed to the spring coupling boss 114.

5.3 Lever 12

As illustrated in FIG. 8, the lever 12 is rotated by movement of the cover 3 and moves the link 11. The lever 12 is disposed in the third groove 3513 of the side frame 351. The lever 12 is rotatable about a second axis 120. The second axis 120 extends in the second direction. Since the lever 12 rotates about the second axis 120 extending in the second direction, and moves the link 11 in the third direction, it is possible to suppress movement of the link 11 in the second direction. Accordingly, it is possible to reduce the dimension of the cover 3 in the second direction.

The lever 12 includes a tubular portion 121, a coupling portion 123 and a contact portion 122.

The tubular portion 121 extends in the second direction. The tubular portion 121 has a tubular shape. The lever boss 356 fits into the tubular portion 121.

The coupling portion 123 protrudes from the tubular portion 121 in a radial direction of the tubular portion 121. The coupling portion 123 includes an elongated hole 1231. The elongated hole 1231 extends in a radial direction of the tubular portion 121. The lever coupling boss 113 of the link 11 fits into the elongated hole 1231.

The contact portion 122 is spaced apart from the coupling portion 123 in a circumferential direction of the tubular portion 121. The contact portion 122 protrudes from the tubular portion 121 in the radial direction of the tubular portion 12L In the state in which the cover 3 is located at the open position, the contact portion 122 is spaced apart from the cover first surface 3551 of the lever stopper 355. As illustrated in FIG. 9, in the state in which the cover 3 is located at the closed position, the contact portion 122 is in contact with the cover first surface 3551 of the lever stopper 355.

5.4 Link 13

The link 13 moves based on movement of the cover 3, and rotates the lever 12. The link 13 is disposed in the fourth groove 3514 of the side frame 351. The link 13 is spaced apart from the link 11 in the first direction. The link 13 is movable in the third direction. In the state in which the cover 3 is located at the open position, the link 13 is spaced apart from the contact portion 122 in the third direction (see FIG. 8). When the cover 3 moves from the open position to the closed position, the link 13 comes into contact with the contact portion 122 of the lever 12. Accordingly, the lever 12 rotates until the contact portion 122 comes into contact with the cover first surface 3551 of the lever stopper 355. In the state in which the cover 3 is located at the closed position, the link 13 is in contact with the contact portion 122.

5.5 Link Arm 15

As illustrated in FIG. 10, the link arm 15 connects the housing 2 and the link 13. The link arm 15 includes a first end 151 and a second end 152 spaced apart from the first end 151. The first end 151 of the arm 15 is rotatably supported by the housing 2. The second end 152 of the arm 15 is rotatably coupled to the link 13.

6. Operations of Exposing Heads at Movement of Cover 3 from Open Position to Closed Position There will be next described operations of the exposing heads when the cover 3 moves from the open position to the closed position, with reference to FIG. 2 to FIG. 4, and FIG. 8 to FIG. 10.

When the cover 3 moves from the open position to the closed position, the link arm 15 rotates with the first end 151 as a fulcrum such that the second end 152 moves closer to the second end 32 of the cover 3. As a result, as illustrated in FIG. 9, the link 13 moves in the third direction, and the link 13 comes into contact with the contact portion 122. Accordingly, the coupling portion 123 pulls the lever coupling boss 113 toward the first end 31 of the cover 3 by rotation of the lever 12.

As a result, the link 11 moves toward the first end 31 of the cover 3 in the third direction against a force of the spring 14.

At this time, as illustrated in FIG. 3 and FIG. 4, the link 11 simultaneously pushes the boss 7225 of each of the four exposing heads 7Y, 7M, 7C, 7K in the third direction. Accordingly, the four the exposing head 7K, 7C, 7M, 7Y simultaneously start rotating from the second position toward the first position.

When the link 11 moves to the third direction, and the four exposing heads 7Y, 7M, 7C, 7K rotate with respect to the cover 3, each of the bosses 7225 moves along each of the four elongated holes 111Y, 111M, 111C, 111K.

After that, as illustrated in FIG. 3, the four exposing heads 7Y, 7M, 7C, 7K are inserted into the housing 2 in order in accordance with movement of the cover 3. At this time, each of the four exposing heads 7Y, 7M, 7C, 7K is inserted into the housing 2 along the up and down direction.

After that, as illustrated in FIG. 2, when the cover 3 reaches the closed position, each of the four exposing heads 7Y, 7M, 7C, 7K reaches the first position.

7. Operation and Effect

As illustrated in FIG. 2, in the image forming apparatus 1, each of the four elongated holes 111Y, 111M, 111C, 111K extends in the direction intersecting the movement direction of the link 11.

Accordingly, when the link 11 moves based on movement of the cover 3, and the four exposing heads 7Y, 7M, 7C, 7K rotate with respect to the cover 3, each of the bosses 7225 of each of the four exposing heads 7Y, 7M, 7C, 7K moves along each of the elongated holes 111Y, 111M, 111C, 111K.

As illustrated in FIG. 2 and FIG. 4, in the image forming apparatus 1, in the state in which the cover 3 is located at the closed position, the distance L1 between the first axis 70K and the first surface S1 in the third direction is less than the distance L2 between the first axis 70Y and the second surface S2 in the third direction. Moreover, in the state in which the cover 3 is located at the open position, the distance L1 between the first axis 70K and the first surface S1 in the third direction is greater than the distance L2 between the first axis 70Y and the second surface S2 in the third direction.

As a result, when the cover 3 moves between the closed position and the open position, it is possible to appropriately adjust postures of the exposing head 7K and the exposing head 7Y at their rotation movements. Specifically, when the cover 3 moves from the open position to the closed position, first, the exposing head 7K rotates more slowly than the exposing head 7Y, and then the exposing head 7K rotates more quickly than the exposing head 7Y. Accordingly, it is possible to adjust postures of the exposing heads 7Y, 7M, 7C, 7K with respect to the housing 2 at the movement of the cover 3 between the closed position and the open position, and adjust the postures individually for the exposing heads 7Y, 7M, 7C, 7K. It is possible to pull up each of the exposing heads 7Y, 7M, 7C, 7K from the housing 2 in the up and down direction and insert each of the exposing heads 7Y, 7M, 7C, 7K into the housing 2 in the up and down direction. As a result, when the cover 3 moves between the closed position and the open position, it is possible to reduce space through which the exposing head 7K and the exposing head 7Y moves.

As a result, it is possible to use an additional space, produced by reduction of the space through which the exposing heads 7Y, 7M, 7C, 7K pass, for placements of other components, for example, it is possible to increase sizes of the developing cartridges 6Y, 6M, 6C, 6K.

Moreover, it is possible to suppress that the link 11 is pushed by the boss 7225 in a direction intersecting the movement direction of the link 11 when the link 11 moves based on movement of the cover 3, as a result, it is possible to move the link 11 stably. Accordingly, it is possible to stabilize the postures of the four exposing heads 7Y, 7M, 7C, 7K at their rotation movements, and it is possible to reduce space through which the four exposing heads 7Y, 7M, 7C, 7K pass, 7. Modifications Each of the four elongated holes 111Y, 111M, 111C, 111K may not penetrate the link 11 in the first direction. In this case, each of the four elongated holes 111Y, 111M, 111C, 111K is recessed in the first direction from a side surface. That is, each of the four elongated holes 111Y, 111M, 111C, 111K may be a bottomed hole.

Figure 12:
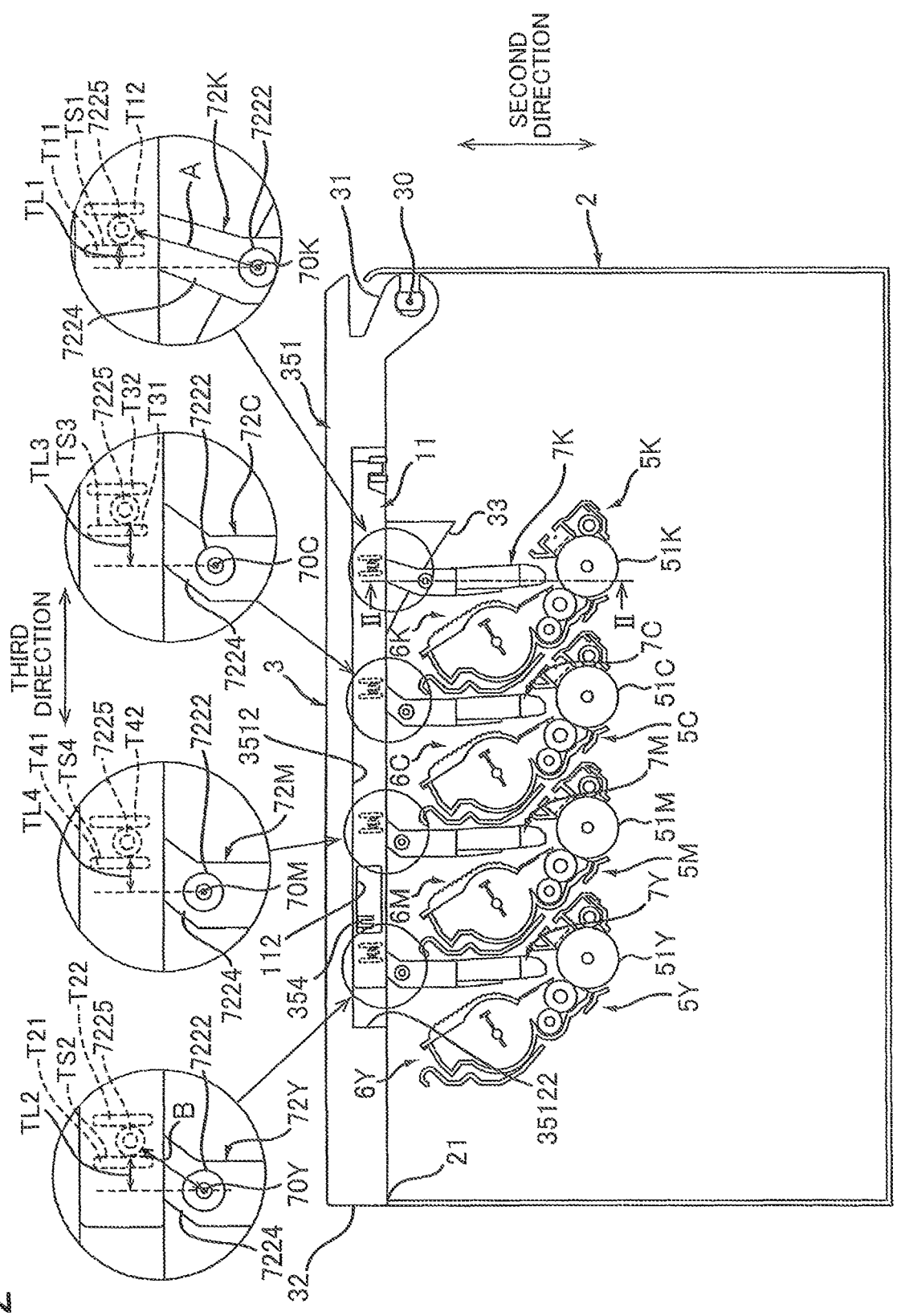
FIG. 12 is a view for explaining a state in which a cover in FIG. 1 is located at a closed position.
Figure 13:
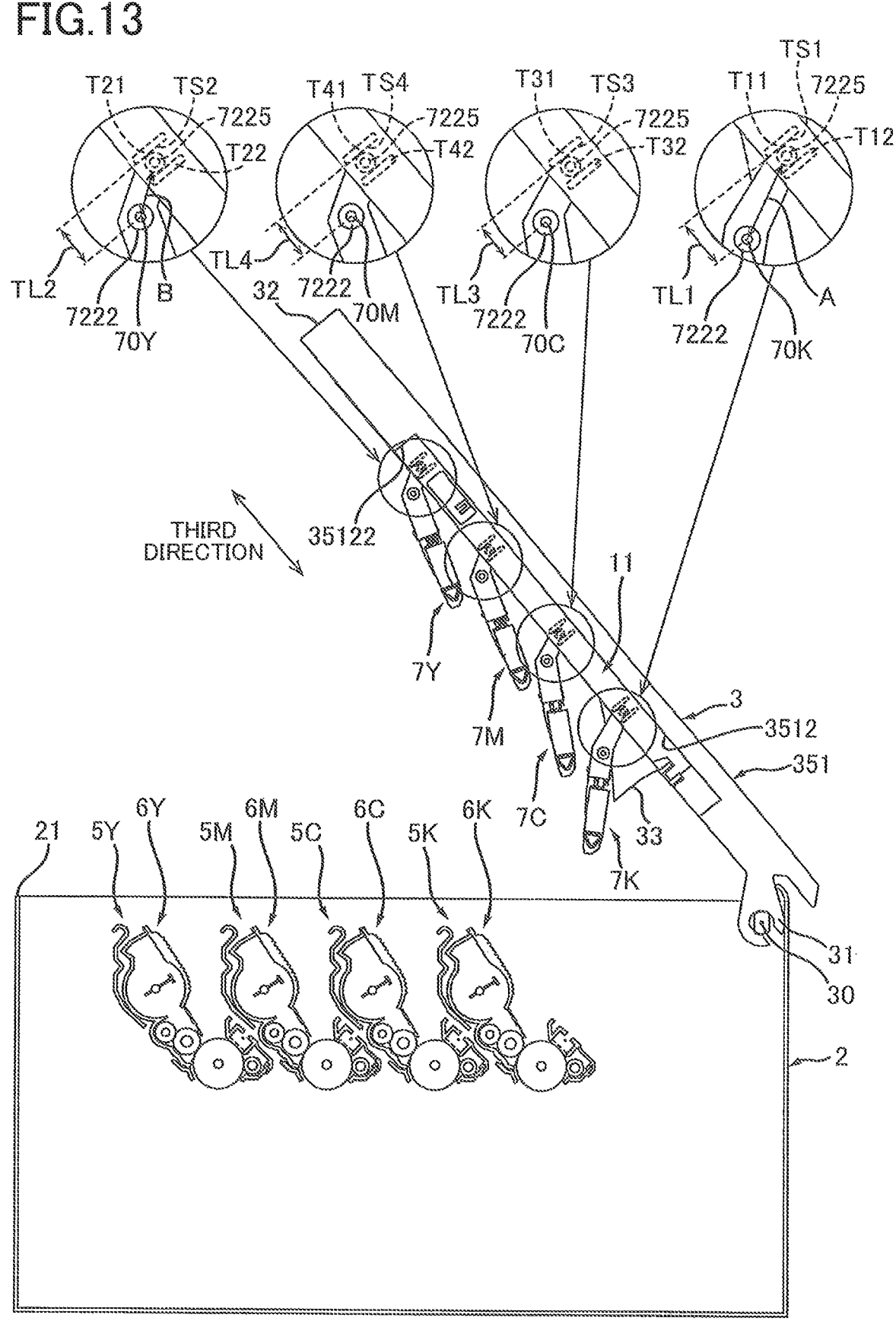
FIG. 13 is a view for explaining a state in which the cover in FIG. 1 is located at the open position.

The link 11 may include a rib in place of the elongated holes 111Y, 111M, 111C, 111K. Specifically, as illustrated in FIG. 12 and FIG. 13, the link 11 may include eight ribs T11, T12, T21, T22, T31, T32, T41, T42. Each of the eight ribs T11, T12, 121, T22, T31, T32, T41, T42 extends in the direction intersecting the movement direction of the link 11. The eight ribs T11, T12, T21, T22, T31, T32, T41, T42 are spaced apart from one another in the movement direction of the link 11, and the eight ribs T11, T12, T21, T22, T31, T32, T41, T42 oppose to one another in the movement direction of the link 11. The boss 7225 of the exposing head 7K fits into between two adjacent ribs, for example, the ribs T11 and T12, of the eight ribs T11, T12, T21, T22, T31, T32, T41, T42, which are opposed to each other and spaced apart from each other in the movement direction of the link 11. It is noted that two end portions in the second direction of the two adjacent ribs may be coupled to each other and may be separated from each other. Moreover, one rib T12 of two ribs T11, T12 into which the boss 7225 of the exposing head 7K fits is spaced apart from the first end 31 of the cover 3 in the third direction. The one rib T12 is an example of a first rib. The other rib T11 of the two ribs T11, T12 into the boss 7225 of the exposing head 7K fits is located at a position opposite to the first end 31 of the cover 3 with respect to the one rib T12 of the two ribs T11, T12, and the other rib T11 of the two ribs T11, T12 includes a rib first surface TS1. The other rib T11 is an example of a second rib. The rib first surface TS1 is an example of a first surface.

Moreover, one rib T22 of two ribs T21, T22 into which the boss 7225 of the exposing head 7Y fits is located at a position opposite to the first end 31 of the cover 3 with respect to the two ribs T11, T12 into which the boss 7225 of the exposing head 7K fits in the third direction. The one rib T22 is an example of a third rib. The other rib T21 of the two ribs T21, T22 into which the boss 7225 of the exposing head 7Y fits is located at a position opposite to the first end 31 with respect to the one rib T22 of the tow ribs T21, T22, and the other rib T21 of the two ribs T21, T22 includes a rib second surface TS2. The other rib T21 is an example of a fourth rib. The rib second surface is an example of a second surface. As illustrated in FIG. 12 and FIG. 13, the rib T41 includes a rib fourth surface TS4, and the rib T31 includes a rib third surface TS3.

As illustrated in FIG. 12, in the state in which the cover 3 is located at the closed position, a distance TL1 between the first axis 70K and the rib first surface TS1 in the third direction is less than a distance TL2 between the first axis 70Y and the rib second surface TS2 in the third direction.

As illustrated in FIG. 13, in the state in which the cover 3 is located at the open position, the distance TL1 between the first axis 70K and the rib first surface TS1 in the third direction is greater than the distance TL2 between the first axis 70Y and the rib second surface TS2 in the third direction.

As a result, when the cover 3 moves between the closed position and the open position, it is possible to appropriately adjust postures of the exposing head 7K and the exposing head 7Y at their rotation movements. Specifically, when the cover 3 moves from the open position to the closed position, first, the exposing head 7K moves more slowly than the exposing head 7Y, and then the exposing head 7K moves more quickly than the exposing head 7Y. Accordingly, it is possible to adjust postures of the exposing heads 7Y, 7M, 7C, 7K with respect to the housing 2 at the movement of the cover 3 between the closed position and the open position, and adjust the postures individually for the exposing heads 7Y, 7M, 7C, 7K. It is possible to pull up each of the exposing heads 7Y, 7M, 7C, 7K from the housing 2 in the up and down direction, and insert each of the exposing heads 7Y, 7M, 7C, 7K into the housing 2 in the up and down direction. As a result, when the cover 3 moves between the closed position and the open position, it is possible to reduce space through which the exposing head 7K and the exposing head 7Y pass.

Moreover, as illustrated in FIG. 12, in the state in which the cover 3 is located at the closed position, a distance TL3 between the first axis 70C and the rib third surface TS3 in the third direction is greater than the distance TL1 between the first axis 70K and the rib first surface TS1 in the third direction, and less than the distance TL2 between the first axis 70Y and the rib second surface TS2 in the third direction.

As illustrated in FIG. 13, in the state in which the cover 3 is located at the open position, the distance TL3 between the first axis 70C and the rib third surface TS3 in the third direction is less than the distance TL1 between the first axis 70K and the rib first surface TS1 in the third direction, and greater than the distance TL2 between the first axis 70Y and the rib second surface TS2 in the third direction. It is noted that a distance TL4 is the same as the distance TL2.

As a result, when the cover 3 moves from the open position to the closed position, first, the exposing head 7C rotates more quickly than the exposing head 7K, and rotates more slowly than the exposing head 7Y. Then, the exposing head 7C rotates more slowly than the exposing head 7K, and rotates more quickly than the exposing head 7Y. Accordingly, when the cover 3 moves between the closed position and the open position, it is possible to pull up the exposing head 7C from the housing 2 in the up and down direction, and insert the exposing head 7C into the housing 2 in the up and down direction. As a result, when the cover 3 moves between the closed position and the open position, it is possible to reduce space through which the exposing head 7C passes.

As described above, in the modifications, it is possible to achieve the same operations and effects as achieved in the above described embodiment.

What is claimed is:

1. An image forming apparatus, comprising:
   a housing having an opening;
   a cover movable between an open position at which the opening is open and a closed position at which the opening is closed;
   a first photoconductive drum and a second photoconductive drum each disposed in the housing;
   a first exposing head having a first boss and rotatably coupled to the cover;
   a second exposing head having a second boss and rotatably coupled to the cover; and
   a link rotatably coupled to each of the first exposing head and the second exposing head and movable with respect to the cover based on movement of the cover, the link being configured to rotate each of the first exposing head and the second exposing head with respect to the cover when the cover moves,
   wherein the link includes (i) a first elongated hole into which the first boss fits and extending a direction intersecting a movement direction in which the cam moves and (ii) a second elongated hole into which the second boss fits and extending in a direction intersecting the movement direction of the link,
   wherein the image forming apparatus further comprises a first drum cartridge including the first photoconductive drum and mountable on the housing, and a second drum cartridge including the second photoconductive drum and mountable on the housing,
   wherein the cover includes a first end at which the cover is coupled to the housing and a second end spaced apart from the first end in a third direction,
   wherein the first exposing head is rotatable, with respect to the cover, about a first axis extending in a first direction intersecting the third direction,
   wherein the second exposing head is rotatable, with respect to the cover, about a second axis extending in the first direction,
   wherein the first axis is located at a position nearer to the first end of the cover than the second axis in the third direction,
   wherein the first elongated bole includes a first surface located between the second end of the cover and the first boss,
   wherein the second elongated hole includes a second surface located at a position opposite to the first end with respect to the first elongated hole and located between the second end of the cover and the second boss,
   wherein, in a state in which the cover is located at the closed position, a distance in the third direction between the first axis and the first surface is less than a distance in the third direction between the second axis and the second surface, and
   wherein, in a state in which the cover is located at the open position, the distance in the third direction between the first axis and the first surface is greater than the distance in the third direction between the second axis and the second surface.

2. The image forming apparatus according to claim 1 wherein a dimension of the first elongated hole in the direction intersecting the movement direction of the link is greater than a dimension of the first boss in the direction intersecting the movement direction of the link,
   wherein a dimension of the first elongated hole in the movement direction of the cam is identical with a dimension of the first boss in the movement direction of the link,
   wherein a dimension of the second elongated hole in the direction intersecting the movement direction of the link is greater than a dimension of the second boss in the direction intersecting the movement direction of the link, and
   wherein a dimension of the second elongated hole in the movement direction of the link is identical with a dimension of the second boss in the movement direction of the link.

3. The image forming apparatus according to claim 1, further comprising a lever configured to move the link by rotating together with the cover,
   wherein the first exposing head is rotatable about a first axis extending in a first direction, and
   wherein the lever is rotatable about an axis extending in a second direction intersecting the first direction.

4. The image forming apparatus according to claim 3, wherein the cover includes a guide surface supporting the link and configured to stop movement of the link in the first direction, the guide surface being configured to guide movement of the link in a third direction intersecting the first direction and the second direction.

5. The image forming apparatus according to claim 4, wherein the cover includes a stopper configured to stop movement of the link in the second direction.

6. The image forming apparatus according to claim 3, wherein the cover includes a cover-first-surface configured to stop rotation of the lever when the cover moves from the open position to the closed position.

7. The image forming apparatus according to claim 6, wherein the cover includes a cover-second-surface configured to stop movement of the link when the cover moves from the closed position to the open position.

8. The image forming apparatus according to claim 1, wherein the first exposing head includes (i) a first emitter configured to expose the first photoconductive drum and (ii) a first frame supporting the first emitter and including the first boss, and
wherein the second exposing head includes a second emitter configured to expose the second photoconductive drum and a second frame supporting the second emitter and including the second boss.

9. The image forming apparatus according to claim 1, further comprising:
a third photoconductive drum and a fourth photoconductive drum each disposed in the housing;
a third exposing head having a third boss and rotatably coupled to the cover; and
a fourth exposing head having a fourth boss and rotatably coupled to the cover,
wherein the link is coupled to each of the third exposing head and the fourth exposing head and configured to rotate each of the third exposing head and the fourth exposing head with respect to the cover when the cover moves, and
wherein the link includes a third elongated hole into which the third boss fits and extending in the direction intersecting the movement direction of the link and a fourth elongated hole into which the fourth boss fits and extending in the direction intersecting the movement direction of the link.

10. The image forming apparatus according to claim 1, wherein, in the state in which the cover is located at the open position, a distance between the first axis and the first boss is greater than a distance between the second axis and the second boss.

11. The image forming apparatus according to claim 1, further comprising:
a third drum cartridge including a third photoconductive drum and mountable on the housing; and
a third exposing head having a third boss and coupled to the cover, the third exposing head being rotatable, with respect to the cover, about a third axis extending in the first direction,
wherein the link is coupled to the third exposing head and configured to rotate, with respect to the cover, the third exposing head when the cover moves,
wherein the third axis is located between the first axis and the second axis in the third direction,
wherein the link includes a third elongated hole into which the third boss fits and including a third surface located between the first elongated hole and the second elongated hole, the third surface being located between the second elongated hole and the third boss,
wherein, in which the cover is located at the closed position, a distance in the third direction between the third axis and the third surface is greater than the distance in the third direction between the first axis and the first surface, and less than the distance in the third direction between the second axis and the second surface in a state, and
wherein, in a state in which the cover is located at the open position, the distance in the third direction between the third axis and the third surface is less than the distance in the third direction between the first axis and the first surface, and greater than the distance in the third direction between the second axis and the second surface.

12. An image forming apparatus, comprising:
a housing having an opening;
a cover movable between an open position at which the opening is open and a closed position at which the opening is closed;
a first photoconductive drum and a second photoconductive drum each disposed in the housing;
a first exposing head having a first boss and rotatably coupled to the cover;
a second exposing head having a second boss and rotatably coupled to the cover; and
a link rotatably coupled to each of the first exposing head and the second exposing head and movable with respect to the cover based on movement of the cover, the link being configured to rotate each of the first exposing head and the second exposing head with respect to the cover when the cover moves,
wherein the link includes:
a first rib extending in a direction intersecting a movement direction in which the link moves;
a second rib extending in a direction intersecting the movement direction of the link, the second rib being opposed to the first rib with a space;
a third rib extending in the direction intersecting the movement direction of the link; and
a fourth rib extending in the direction intersecting the movement direction of the link, the fourth rib being opposed to the third rib with a space,
wherein the first boss fits into between the first rib and the second rib, and
wherein the second boss fits into between the third rib and the fourth rib.

13. The image forming apparatus according to claim 12, further comprising:
a first drum cartridge including the first photoconductive drum and mountable on the housing; and
a second drum cartridge including the second photoconductive drum and mountable on the housing,
wherein the cover includes a first end at which the cover is coupled to the housing and a second end spaced apart from the first end in a third direction,
wherein the first exposing head is rotatable, with respect to the cover, about a first axis extending in a first direction intersecting the third direction,
wherein the second exposing head is rotatable, with respect to the cover, about a second axis extending in the first direction,
wherein the first axis is located at a position closer to the first end of the cover than the second axis in the third direction,
wherein the first rib is located at a position spaced apart from the first end of the cover,
wherein the second rib includes a first surface located at a position opposite to the first end with respect to the first rib and contactable with the first boss,
wherein the third rib is located at a position opposite to the first end with respect to the second rib,
wherein the fourth rib includes a second surface located at a position opposite to the first end with respect to the third rib and contactable with the second boss, wherein a distance in the third direction between the first axis and the first surface is less than a distance in the third direction between the second axis and the second surface in a state in which the cover is located at the closed position, and wherein the distance in the third direction between the first axis and the first surface is greater than the distance in the third direction between the second axis and the second surface in a state in which the cover is located at the open position.

14. The image forming apparatus according to claim 12, further comprising a lever configured to move the link by rotating together with the cover, wherein the first exposing head is rotatable about a first axis extending in a first direction, and wherein the lever is rotatable about an axis extending in a second direction intersecting the first direction.

15. The image forming apparatus according to claim 14, wherein the cover includes a guide surface supporting the link and configured to stop movement of the link in the first direction, the guide surface being configured to guide movement of the link in a third direction intersecting the first direction and the second direction.

16. The image forming apparatus according to claim 15, wherein the cover includes a stopper configured to stop movement of the link in the second direction.

17. The image forming apparatus according to claim 14, wherein the cover includes a cover-first-surface configured to stop rotation of the lever when the cover moves from the open position to the closed position.

18. The image forming apparatus according to claim 17, wherein the cover includes a cover-second-surface configured to stop movement of the link when the cover moves from the closed position to the open position.

19. An image forming apparatus, comprising:
a housing having an opening;
a cover movable between an open position, at which the opening is open, and a closed position, at which the opening is closed;
a first photoconductive drum and a second photoconductive drum, each disposed in the housing;
a first exposing head having a first boss and being rotatably coupled to the cover;
a second exposing head having a second boss and being rotatably coupled to the cover; and
a link rotatably coupled to each of the first exposing head and the second exposing head and movable with respect to the cover based on movement of the cover, the link being configured to rotate each of the first exposing head and the second exposing head with respect to the cover when the cover moves,
wherein the link includes (i) a first elongated hole, into which the first boss fits, extending a direction intersecting a movement direction in which the link moves and (ii) a second elongated hole, into which the second boss fits, extending in a direction intersecting the movement direction of the link,
wherein the image forming apparatus further comprises a lever configured to move the link by rotating together with the cover,
wherein the first exposing head is rotatable about a first axis extending in a first direction, and
wherein the lever is rotatable about an axis extending in a second direction intersecting the first direction.

20. An image forming apparatus, comprising:
a housing having an opening;
a cover movable between an open position, at which the opening is open, and a closed position, at which the opening is closed;
a first photoconductive drum and a second photoconductive drum, each disposed in the housing;
a first exposing head having a first boss and being rotatably coupled to the cover:
a second exposing head having a second boss and being rotatably coupled to the cover; and
a link rotatably coupled to each of the first exposing head and the second exposing head and movable with respect to the cover based on movement of the cover, the link being configured to rotate each of the first exposing head and the second exposing head with respect to the cover when the cover moves,
wherein the link includes (i) a first elongated hole, into which the first boss fits, extending a direction intersecting a movement direction in which the link moves and (ii) a second elongated hole, into which the second boss fits, extending in a direction intersecting the movement direction of the link, and
wherein the cover includes a cover-surface configured to stop movement of the link when the cover moves from the closed position to the open position.

* * * * *